United States Patent [19]
Kurihara et al.

[11] Patent Number: 5,737,542
[45] Date of Patent: Apr. 7, 1998

[54] INFORMATION PROCESSING DEVICE, EXPANSION BOARD AND EXPANDING HOUSING SYSTEM

[75] Inventors: Ken Kurihara; Hiroshi Tezuka, both of Tokyo; Hiroyuki Kobayashi, Kanagawa, all of Japan

[73] Assignee: Sony Corporation, Tokyo, Japan

[21] Appl. No.: 541,979

[22] Filed: Oct. 10, 1995

Related U.S. Application Data

[63] Continuation of Ser. No. 143,282, Oct. 25, 1993, abandoned.

[30] Foreign Application Priority Data

Oct. 27, 1992 [JP] Japan ..................... 4-311449

[51] Int. Cl.$^6$ ........................... G06F 13/00
[52] U.S. Cl. ............. 395/282; 395/284; 395/800.01; 711/2; 711/5; 711/172
[58] Field of Search .................. 395/800, 282, 395/284, 402, 497.01, 405, 497.03; 364/DIG. 1

[56] References Cited

U.S. PATENT DOCUMENTS

| | | | |
|---|---|---|---|
| 4,951,248 | 8/1990 | Lynch | 364/DIG. 2 |
| 5,119,486 | 6/1992 | Albonesi | 395/497.03 |
| 5,129,069 | 7/1992 | Helm et al. | 395/400 |
| 5,148,389 | 9/1992 | Hughes | 395/800 |
| 5,161,102 | 11/1992 | Griffin et al. | 395/800 |
| 5,175,836 | 12/1992 | Morgan | 395/425 |
| 5,241,665 | 8/1993 | MacDonald | 395/425 |
| 5,265,238 | 11/1993 | Cadova, Jr. et al. | 395/500 |
| 5,293,607 | 3/1994 | Brockmann et al. | 395/405 |
| 5,299,322 | 3/1994 | Arai et al. | 395/275 |
| 5,301,334 | 4/1994 | Horiuchi | 395/750 |
| 5,353,432 | 10/1994 | Richek et al. | 395/500 |
| 5,357,621 | 10/1994 | Cox | 395/400 |
| 5,455,957 | 10/1995 | Pawlowski et al. | 395/800 |
| 5,535,368 | 7/1996 | Ho et al. | 395/497.01 |
| 5,598,540 | 1/1997 | Krueger | 395/284 |

*Primary Examiner*—Alyssa H. Bowler
*Assistant Examiner*—Walter D. Davis
*Attorney, Agent, or Firm*—Limbach & Limbach L.L.P.

[57] ABSTRACT

The size of the address space to be occupied by an expanded board installed into a slot is identified, and the corresponding relationship between an address of a computer and a slot selection signal for selecting any one of the slots is set in a mapping table on the basis of the identification result, whereby the address space to be occupied by the expanded board is adaptably allocated on an address space of the computer.

12 Claims, 10 Drawing Sheets

INFORMATION PROCESSING DEVICE, EXPANSION BOARD AND EXPANDING HOUSING SYSTEM

This is a continuation of application Ser. No. 08/143,282 filed Oct. 25, 1993, now abandoned.

BACKGROUND OF THE INVENTION

1. Field of the Invention

This invention relates to an information processing device, an expanded board to be installed into a slot of the device and an expanding housing system for expanding the slot for use in an engineering work station, etc.

2. Description of Related Art

FIG. 1 is a block diagram showing the configuration of a conventional computer system, and FIG. 2 is a perspective view of the computer system as shown in FIG. 1. A computer 500 carries out the control for the whole device, and it comprises a ROM 502 for storing system program data, a RAM 503 for storing an user program data and data required for the operation of the device, and a CPU 501 for accessing the system program data stored in the ROM 502 and the user program data stored in the RAM 503 to execute these programs.

As shown in FIG. 2, the computer 500 is further provided with a slot portion 524 comprising three expanded slots (hereinafter referred to as "slots") 524a to 524c into which expanded boards 510, 511 and 512, such as an interface board to be connected to a graphic display, a network or the like, an image processing board for carrying out an image processing and an audio processing board for carrying out an audio processing respectively, are installed. Upon access of each of the installed expanded boards 510, 511 and 512 by the CPU 501, a prescribed processing is carried out in each of the expanded boards 510, 511 and 512.

As shown in FIG. 2, the expanded board 510 (511, 512) is inserted along one of rails 521 to 523 which are respectively provided at both sides of the slots 524a to 524c until a connector 520 of the expanded board is engaged with a connector provided inside of the slot portion 524 (as indicated by oblique lines in FIG. 2), thereby installing the expanded board in the computer 500.

When the computer 500 carries out an access operation for the installed expanded board 510 (511, 512), the ROM 502 or the RAM 503 thereof, an object (element) to be accessed is selected in accordance with an address output from the CPU 501 of the computer 500. The whole address space of the computer 500 (CPU 501) is limited, and thus an address space must be effectively allocated to each of the expanded boards 510, 511, 512, the ROM 502 and the RAM 503.

The address space allocation for the expanded boards 510, 511 and 512 installed into the computer 500 have been performed as follows.

For example, as shown in FIG. 3, the expanded board 510 is allocated with a fixed address space corresponding to the kind of the expanded board 510, and it is further provided with a decoder 510a for decoding an address output from the CPU 501 in addition to a processing circuit 510b for carrying out a processing inherent to the expanded board 510. In this case, when a specific address corresponding to the kind of the expanded board 510 is supplied from the CPU 501, the expanded board 510 is selected, and thus can be accessed by the computer 500.

However, in this case, if the same kind of expanded board is further installed into the computer 500, there would occur a problem that the same address is duplicatively allocated. In addition, in this case, if the kind of the expanded boards which are installed in the computer 500 is increased, there would also occur a problem that no available address space exists.

In order to avoid the above problems, the following configuration like the expanded board 511 as shown in FIG. 3 is proposed. That is, in addition to a decoder 511a for decoding an address supplied from the CPU 501 and a processing circuit 511b for carrying out its inherent processing, a switch 511c for setting an address space which the expanded board 511 occupies (for example, a starting address of the address space) is further provided to the expanded board 511, thereby making the allocated address space variable.

However, in this case, the switch 511c must be set by the user, thus requiring the user to perform additional, inconvenient tasks. In addition, if the switch 511c is erroneously set, an address which the expanded board occupies will be duplicatively allocated, causing the device to malfunction. Further, even if the switch 511c is correctly set, a program (software) to be executed on the computer 500 must be sometimes altered, and this requires the user to have a special knowledge on the device.

In order to avoid these problems, the following configuration as shown in FIG. 4 is proposed. That is, the expanded board 510 or 511 is constructed by only the processing circuit 510b or 511b (not shown in FIG. 4) for carrying out its inherent processing, and a decoder for decoding an address output from the CPU 501 to generate a slot selection signal is further provided to the computer 500. In this case, a specific address space is also allocated to each of the slots 524a to 524c (see FIG. 2) of the computer 500 itself, and each of the expanded boards 510 to 512 installed in the computer 500 is designed to be operated in accordance with the slot selection signal.

In the device thus constructed, any one of the slots 524a to 524c, that is, any one of the expanded boards 510 to 512 is selected in accordance with the slot selection signal, so that addresses which the expanded boards 510 to 512 occupy, respectively, do not overlap one another, and these expanded boards can be simultaneously used even if these are the same kind, for example. In addition, since the specific address space is beforehand allocated to each of the slots 524a to 524c (FIG. 2), it is unnecessary for the user to set the address, and thus the user is relieved from the inconvenient tasks relating to the setting operation of the address.

In this case, however, the size of the address space which can be allocated to each of the slots 524a to 524c is limited, and any expanded board occupying an address space which is larger than the above limited size is not usable. In view of this point, a method of enlarging the size of the address space which is allocated to each of the slots 524a to 524c has been proposed. However, in this method, the number of slots which can be provided in the device is reduced because the total size (I/O address space of the computer 500) of the address spaces allocated to the slots 524a to 524c is limited to a predetermined size.

When a number of expanded boards are required, further slots are required in addition to the slots 524a to 524c of the computer 500. In this case, as shown in FIG. 5, an expanding housing system for expanding slots of the computer 500 may be used.

The expanding housing system includes an expanded housing provided with a slot portion 620 comprising plural slots, an adapter board 610 serving as an interface with the computer 500, and a cable 601 connected to the adapter board 610 and the expanded housing 600.

When the adapter board 610 which is connected to the expanded housing 600 through the cable 601 is installed into the slot (any one of the slots 524a to 524c) of the slot portion 524 like another expanded board 540, the computer 500 is so operated that the respective slots of the slot portion 620 of the expanded housing are treated in the same manner as the slots 524a to 524c of the computer 500.

That is, by using the expanding housing system as shown in FIG. 5, the expanded board 602 or 603 can be installed into any one of the slot portion 524 of the computer 500 or the slot portion 620 of the expanded housing 600, and thus the number of slots of the computer 500 can be substantially increased.

However, in this case, when the expanding housing system is applied to the computer 500 containing the decoder 530 as shown in FIG. 4 therein, an address space allocated to a slot (slot 524b in FIG. 5) into which the adapter board 610 is installed must be divisionally used by plural slots provided to the expanded housing 600, and thus there occurs a problem that an address space to be allocated to each of the slots of the expanded housing 600 is narrowed.

SUMMARY OF THE INVENTION

An object of the invention is to provide an information processing device, an expanded board and an expanding housing system in which an address space occupied by an expanded board can be allocated adaptively.

According to one aspect of this invention, the expanded board which is detachably installed into an information processing device such as a computer 1 and carries out a prescribed processing is equipped with an ID-ROM 220 serving as storage means in which the size of an address space to be occupied by the expanded board is beforehand stored, wherein the address space having the size stored in the ID-ROM 220 is adaptably allocated on an address space of the computer 1.

According to the expanded board thus constructed, the ID-ROM 220 is a read only memory.

According to another aspect of this invention, the information processing device equipped with plural slots (for example, slots 100, 110, 120) into which an expanded board 2 is installed, are provided with identifying means for identifying the size of an address space to be occupied by the expanded board 2 which is installed into the slot 100, 110 or 120, and slot corresponding relationship setting means for setting, on the basis of the identification result of the identifying means, a corresponding relationship between an address of the information processing device and a slot selection signal for selecting any one of the slots 100, 110 and 120. The identifying means comprises program processing steps from S2 to S7 and S24 to S29, or steps from S44 to S47, and the slot corresponding relationship setting means comprises a mapping table 50.

According to another aspect of this invention, an expanding housing system for expanding the slots of the information processing device such as the computer 1 includes an expanded housing 4 provided with plural sub slots (for example, sub slots 360, 370 and 380) into which the expanded board 2, etc. are installed, and adapter board 3 which is installed into the slot 100, 110 or 120, and serves as adapter means for setting a corresponding relationship between an address supplied from the computer 1 and a sub-slot selection signal for selecting any one of the sub slots 360, 370 and 380 on the basis of the size of the address space occupied by the expanded board which is installed into the sub slot 360, 370 or 380 provided to the expanded housing 4.

The expanding housing system thus constructed is equipped with plural expanding housing systems, and these plural expanding housing systems are hierarchically cascade-connected to each other.

According to the expanded board of this invention, the size of an address space to be occupied by the expanded board is beforehand memorized in the ID-ROM 220, and an address space having the size memorized in the ID-ROM 220 is adaptably allocated on the address space of the computer 1. Accordingly, an operation for setting an address to be allocated to the expanded board is not required, and this releases the user of performing inconvenient address allocation tasks.

According to the information processing device of this invention, the size of the address space to be occupied by the expanded board 2 or the like which is installed into the slot 100, 110 or 120 is identified, and on the basis of the identification result, the corresponding relationship between the address of the information processing device and the slot selection signal for selecting any one of the slots 100, 110 and 120 are set in the mapping table 50. Accordingly, the address spaces to be occupied by the slots 100, 110 and 120, etc. are adaptably allocated on the address space of the information processing device without being mutually overlapped with one another. In addition, an operation for setting an address to be allocated to the expanded board 2 or the like is not required, and this relieves the user of performing inconvenient tasks.

According to the expanding housing system of this invention, the corresponding relationship between the address supplied from the computer 1 and the sub slot selection signal for selecting any one of the sub slots 360, 370 and 380 of the expanded housing 4 in which the expanded board 2 or the like is installed is set on the basis of the size of the address space occupied by the expanded board 2 or the like which is installed into the sub slot 360, 370 or 380. Accordingly, the address spaces of the expanded board 2, etc. which are installed into the sub slots 360, 370 and 380 are allocated by desired capacity on the address space of the computer 1 without being overlapped with one another. Therefore, the device can be prevented from malfunctioning due to an insufficient space to be allocated to the expanded board 2.

Further, since the hierarchical cascade-connection can be performed for this expanding housing system, a large number of expanded boards can be used.

DETAILED DESCRIPTION OF THE PREFERRED EMBODIMENTS

Preferred embodiments according to this invention will be hereunder described with reference to the accompanying drawings.

Figure 1:
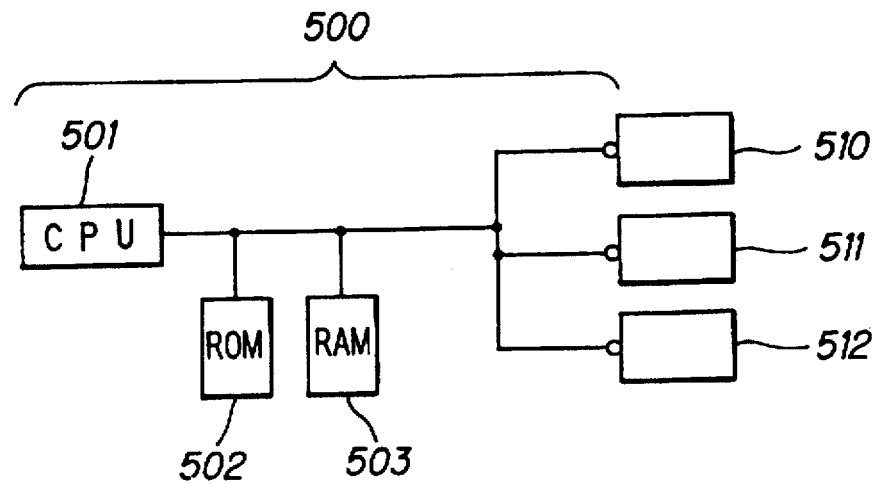
FIG. 1 is a block diagram showing the configuration of a conventional computer system.
Figure 2:
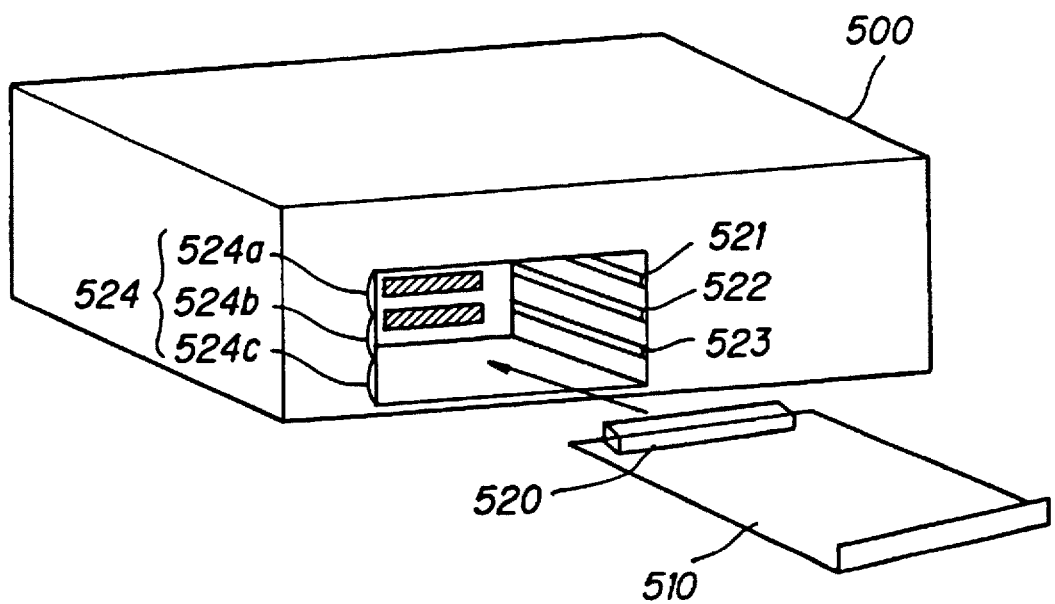
FIG. 2 is a perspective view of the computer system as shown in FIG. 1.
Figure 3:
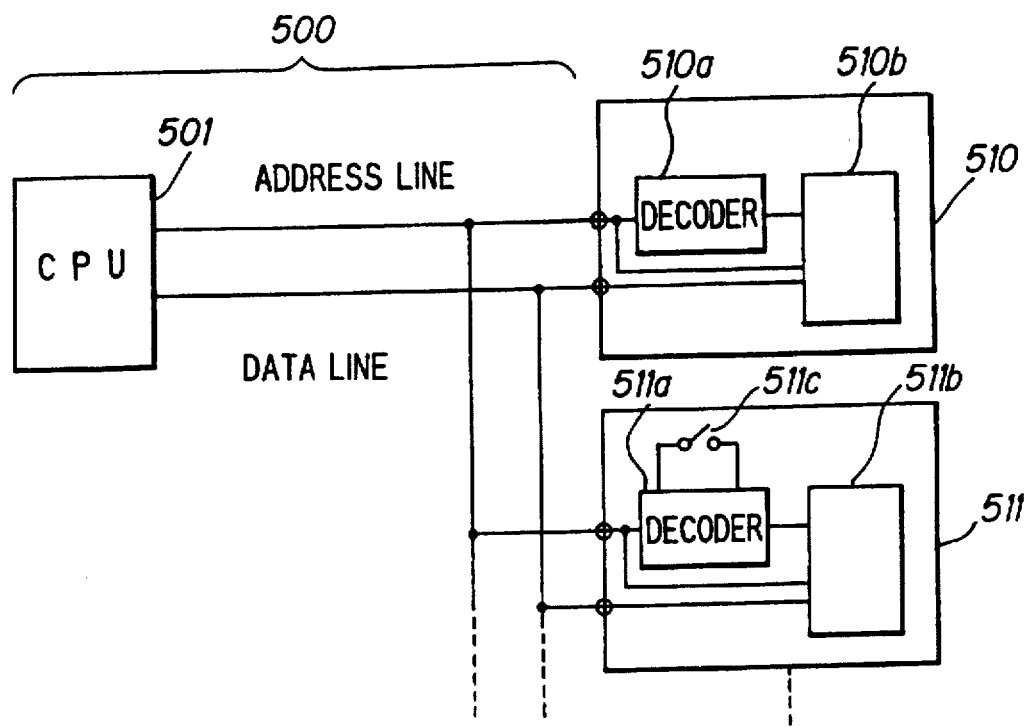
FIG. 3 is a block diagram showing an address allocation of the conventional computer system.
Figure 4:
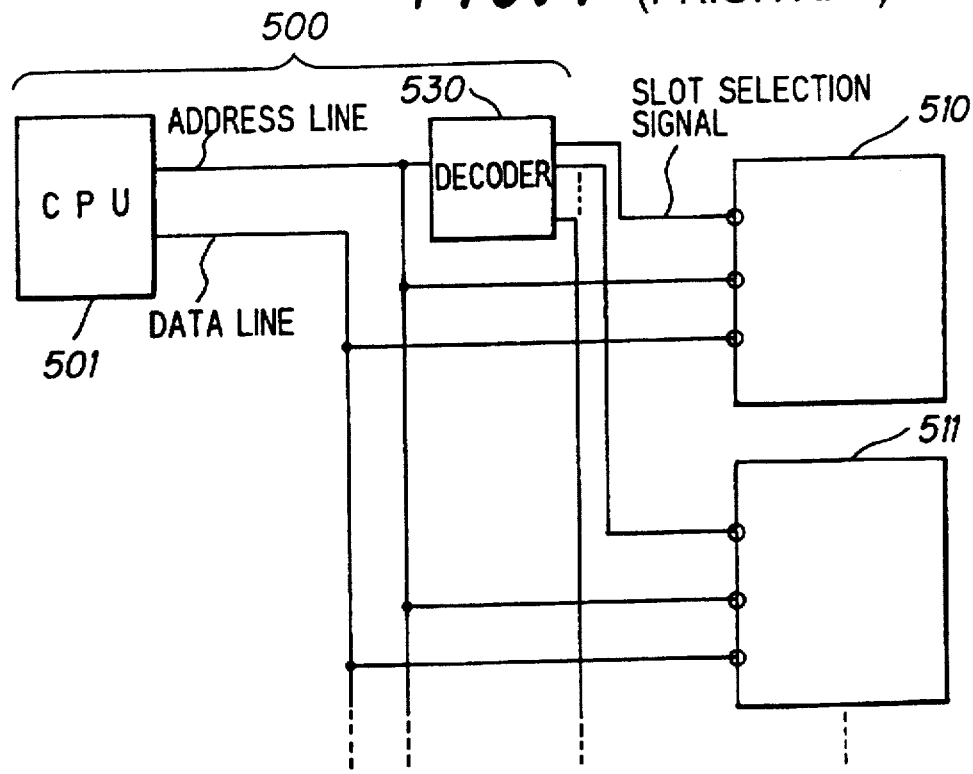
FIG. 4 is a block diagram showing another address allocation of the conventional computer system.
Figure 5:
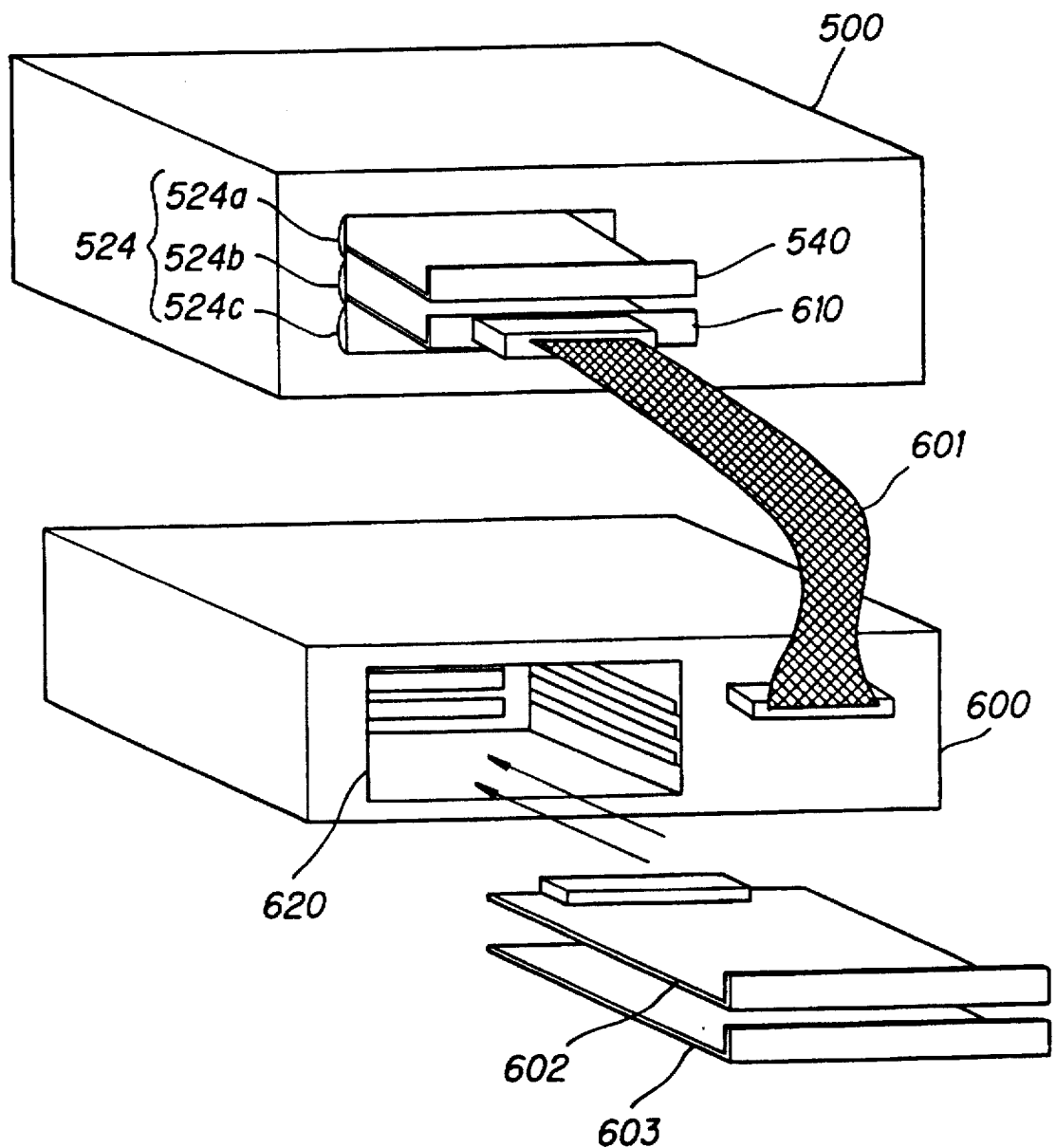
FIG. 5 is a perspective view of the conventional computer system to which an expanded housing is connected.
Figure 6:
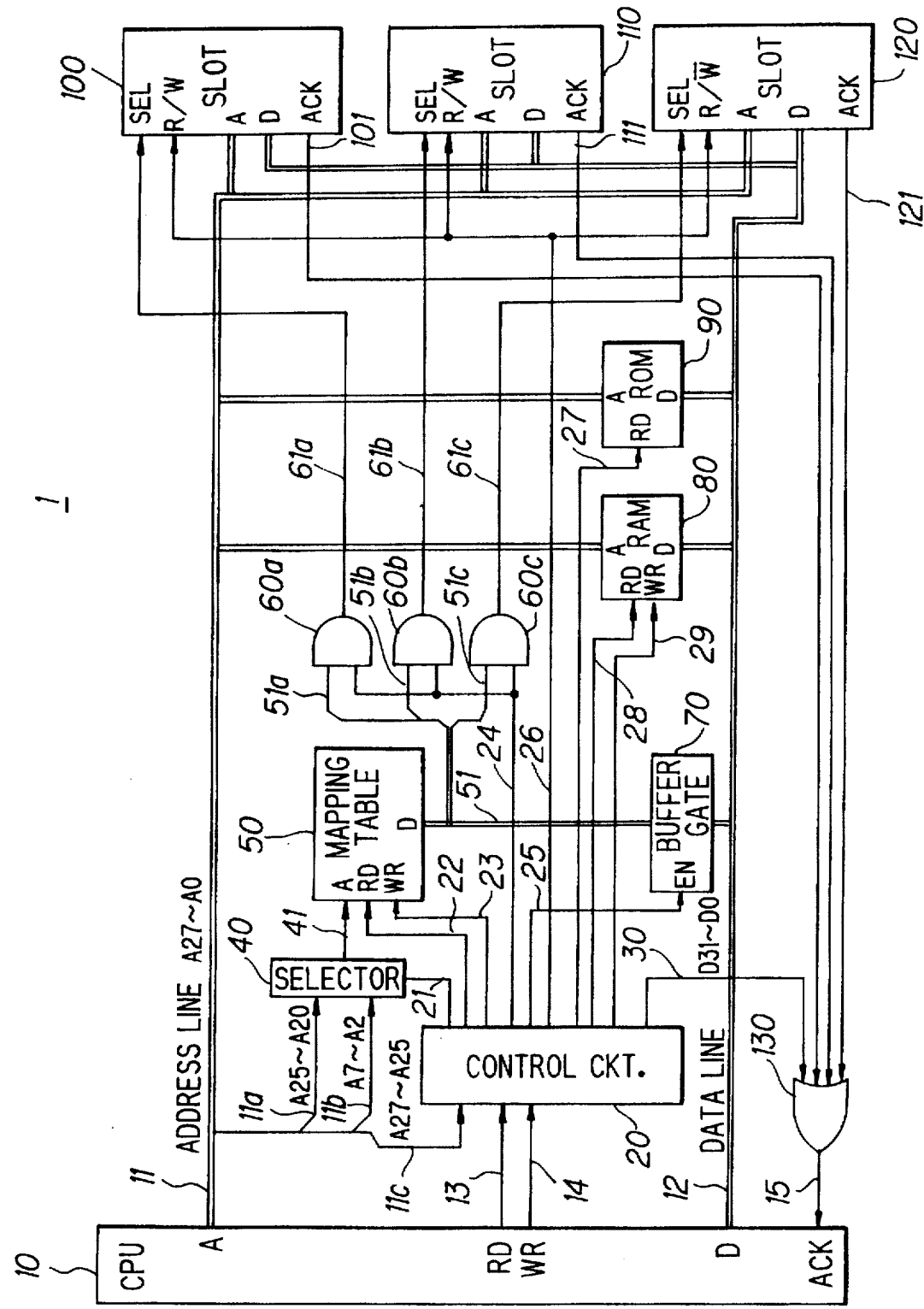
FIG. 6 is a block diagram showing the configuration of an embodiment of the information processing device according to this invention.

FIG. 6 is a block diagram showing the configuration of an embodiment of a computer to which an information processing device of this invention is applied.

The computer as shown in FIG. 6 includes a CPU 10. The CPU 10 has an address terminal (A) which is connected to an address line 11 of 28 bits (A27 to A0) for example, a data terminal (D) which is connected to a data line 12 of 32 bits (D31 to D0), that is, of four bytes, a read signal terminal (RD) which is connected to a read signal line 13, a write signal terminal (WR) which is connected to a write signal line 14, and a response signal terminal (ACK) which is connected to a data response signal line 15, and outputs addresses A27 to A0, data D31 to D0, a read signal and a write signal to the address line 11, the data line 12, the read signal line 13 and the write signal line 14, respectively. Further, the CPU 10 receives the data D31 to D0 from the data line 12 or a data response signal from the data response signal line 15.

Since the CPU 10 is connected to the address line 11 of 28 bits (A27 to A0), that is, the CPU 10 can specify addresses of 28 bits (two to the 28th power), the address space of this computer 1 (CPU 10) is specified to 256 MB, and this address space is divided as follows.

That is, address spaces of 32 MB, 128 MB, 32 MB and 64 MB are allocated to the mapping table (RAM) 50, the RAM 80, the ROM 90 and the slots 100 to 120 (100, 110, 120), respectively, and the access target is determined as follows.

For A27=0, the access target is the RAM 80, for A27=1 and A26=1, the access target is the slots 100 to 120, for A27=1, A26=0 and A25=0, the access target is the ROM 90, and for A27=1, A26=0 and A25=1, the access target is the mapping table (RAM) 50.

For the addresses A27 to A0 and the data D31 to D0, each of the address A0 and the data D0 represents the least significant bit, and each of the address A27 and the data D31 represents the most significant bit. The address space of 64 MB which is allocated to the slots 100 to 120 is hereinafter referred to as "I/O address space".

A selector 40 has one input terminal which is connected to one address terminal 11a of the address line 11, and the other input terminal which is connected to the other address terminal 11b of the address line 11, whereby the addresses A25 to A20 (addresses A7 to A2) are supplied to the selector 40 through the corresponding input terminal. In response to a control signal supplied through a control signal line 21 from a control circuit 20, the selector 40 supplies the addresses A25 to A20 or the addresses A7 to A2 through an address line 41 to the mapping table 50.

The RAM 80 has an address terminal (A) connected to the address line 11, a data terminal (D) connected to the data line 12, a read signal terminal (RD) connected to a read signal line 28 and a write signal terminal (WR) connected to a write signal line 29. On the basis of a read signal (write signal) supplied from the control circuit 20 through the read signal line 28 (write signal line 29), a read-out (write-in) operation of data or an user program is carried out for an address which is supplied from the CPU 10 through the address line 11.

The ROM 90 has an address terminal (A) connected to the address terminal 11, a data terminal (D) connected to the data line 12, and a read signal terminal (RD) connected to a read signal line 27. In the ROM 90 are stored a system program data (a system program and data used for the program), a program data for adaptably allocating an address space to a board which is installed into the slot 100, 110 or 120 (an allocating program for the I/O address space and data used for the program), etc. On the basis of the read signal supplied from the control circuit 20 through the read signal line 27, the data and the program stored at the addresses which are supplied from the CPU 10 through the address line 11 are read out, and then supplied through the data line 12 to the CPU 10.

The mapping table 50 comprises a RAM, and has an address terminal (A), a data terminal (D), a read signal terminal (RD) and a write signal terminal (WR) which are connected to the address line 41, a data line 51, a read signal line 22 and a write signal line 23, respectively.

The mapping table 50 is used to set (store) the corresponding relationship between an address which is outputted from the CPU 10 at the time when the CPU 10 accesses any one of the slots 100 to 120 and a slot selection signal which is outputted to any one of selection signal terminals (SEL) of the slots 100 to 120 through slot selection signal lines 61a to 61c from AND gates 60a to 60c.

That is, it is now assumed that the I/O address space (all address spaces allocated to the slots 100 to 120) of 64 MB is divided into 64 segments each of which is formed of 1 MB, for example, and it is managed in terms of the segment. In this case, the mapping table 50 is so designed that, assuming that three bits whose number is equal to the number of the slots 100 to 120 of the computer 1 correspond to one entry, the mapping table 50 has entries whose number is equal to the number of the segments. That is, the mapping table 50 is constructed by 64 entries.

For each entry which is constructed by three bits, for example, bits B2, B1 and B0 placed in that order, when the bit B0 of the entry is "1" (as a selection of "1" and "0"), an address space of 1 MB as a segment which is managed by the entry is allocated to the slot 100. Further, when the bit B1 is "1" (as a selection of "1" and "0"), an address space of 1 MB as a segment which is managed by the entry is allocated to the slot 110. Still further, when the bit B2 is "1" (as a selection of "1" and "0"), an address space of 1 MB as a segment which is managed by the entry is allocated to the slot 120. Accordingly, there is no case where two or more of the bits B2 to B0 are set to "1" for the same entry.

In this computer 1, when the read-out and write-in operations are carried out for the mapping table 50 itself (bits B2 to B0 of each entry), in order to enable the access to be conducted on all of 64 entries of the mapping table 50, for example, 6 bits of addresses A7 to A2 are used as an index (address) for each entry. In addition, in order to access the slots 100 to 120, for example, 6 bits of addresses A25 to A20 are used as an index (address) for each entry when an entry (bits B2 to B0 of the entry) of the mapping table is read out.

The control circuit 20 is connected to an address line 11c of the address line 11, and the addresses A27 to A25 are supplied from the CPU 10 through the address line 11c. If the address A27 of the addresses A27 to A25 which are supplied from the CPU 10 through the address line 11 and the address line 11c is equal to "0", the control circuit 20 identifies the RAM 80 as the access target as described above, and outputs the read signal (write signal), which are supplied from the CPU 10 through the read signal line 13 (write signal line 14), to the read signal terminal (RD) (write signal terminal(WR)) through the read signal line 28 (write signal line 29). Subsequently, upon completion of the access to the RAM 80, the control circuit 20 outputs the data response signal to the CPU 10 through the data response signal line 30, an OR gate 130 and the data response signal line 15.

If the addresses A27 to A25 supplied from the CPU 10 through the address lines 11 and 11c are equal to "1", "0" and "0" respectively, the control circuit 20 judges the access target to be the ROM 90 as described above, and outputs the read signal supplied from the CPU 10 through the read signal line 13 to the read signal terminal (RD) of the ROM 90 through the read signal line 27. Subsequently, upon completion of the access of the ROM 90, the control circuit 20 outputs the data response signal to the CPU 10 through the data response signal line 30, the OR gate 130 and the data response signal line 15.

If the addresses A27 to A25 supplied from the CPU 10 through the address lines 11 and 11c are equal to "1", "0" and "1" respectively, the control circuit 20 identifies the mapping table 50 as the access target as described above to output the read signal (write signal) supplied from the CPU 10 through the read signal line 13 (write signal line 14) to the read signal terminal (RD)(write signal terminal (WR)) of the mapping table 50 through the read signal line 22 (write signal line 23).

At the same time, the control circuit 20 outputs a control signal to the selector 40 through the control signal line 21 so that the selector selects the address group (the addresses A7 to A2) of both of an address group comprising the addresses A25 to A20 (hereinafter referred to as "second address group") supplied from the CPU 10 through the address lines 11 and 11a to the selector 40 and the other group comprising the addresses A7 to A2 (hereinafter referred to as "first address group") supplied from the CPU 10 through the address lines 11 and 11b to the CPU 10, and outputs the selected address group to the mapping table 50 through the address line 41. The control circuit 20 also outputs an enable signal through the control signal line 25.

A buffer gate 70 is disposed between the data line 51 of the mapping table 50 and the data line 12 of the CPU 10. Normally, it serves to separate the data line 51 and the data line 12 (keep these lines in an electrically-disconnected state). However, when the enable signal is supplied from the control circuit 20 through the control signal line 25 to the enable terminal (EN) of the buffer gate 70, it serves to electrically connect the data lines 51 and 12 to each other (keep these data lines in an electrically-connected state).

Accordingly, when the enable signal is outputted from the control circuit 20 through the control signal line 25 to the buffer gate 70, the CPU 10 is allowed to access the mapping table 50 through the data line 12, the buffer gate 70 and the data line 51.

Upon completion of the access to the mapping table 50 by the CPU 10, the control circuit outputs the data response signal to the CPU 10 through the data response signal line 30, the OR gate 130 and the data response signal line 15.

Further, if A27 and A26 of the addresses A27 to A25 supplied from the CPU 10 through the address lines 11 and 11c are equal to "1" and "1" respectively, the control circuit 20 identifies the slots 100 to 120 (accurately specifying, the boards installed into these slots) as the access target, and outputs the read signal through the read signal line 22 to the read signal terminal (RD) of the mapping table 50. Thereafter, in response to the read signal (write signal) supplied from the CPU 10 through the read signal line 13 (write signal line 14), the control circuit 20 sets a read/write identification signal to "1" or "0" (for example, "1" for supply of the read signal, and "0" for supply of the write signal), and outputs the read/write identification signal to read/write identification signal terminals (R/$\overline{W}$) (a bar "–" is affixed above "W" in FIG. 6)) of the slots 100 to 120 through a read/write identification signal line 26.

Subsequently, the control circuit outputs a control signal through the control signal line 21 to the selector 40 so that the selector 40 selects the second address group (addresses A25 to A20) of both of the second address group (A25 to A0) supplied from the CPU 10 through the address lines 11 and 11a and the first address group (A7 to A2) supplied from the CPU 10 through the address lines 11 and 11b, and outputs the selected address group to the mapping table 50 through the address line 41.

Through the above operation, the addresses A25 to A20 are outputted from the selector 40 through the address line 41 to the mapping table 50, and three bits B0 to B2 of an entry indexed by the selected addresses A25 to A20 are respectively outputted from the mapping table 50 to one input terminals of AND gates 60a to 60c through a 3-bit data line 51 and one-bit data lines 51a to 51c each constituting the data line 51 in combination.

Here, the one input terminals of the AND gates 60a to 60c are connected to the data lines 51a to 51c of the data line 51 respectively, and all of the other input terminals of the AND gates 60a to 60c are connected to the control signal line 24. The output terminals of these AND gates are connected to slot selection signal lines 61a to 61c, respectively.

As described above, if an address space managed by the entry which is indexed by the addresses A25 to A20 output from the selector 40 is allocated to any one of the slots 100 to 120, any one of the bits B0 to B2 is set to "1", and thus any one of the input terminals of the AND gates 60a to 60c is set to "1". At the same time, the control circuit 20 outputs an enable signal (signal having "1" value) to each of the other input terminals of the AND gates 60a to 60c through the control signal line 24. Through the above operation, all of the other input terminals of the AND gates 60a to 60c are set to "1".

Accordingly, one of the output terminals of the AND gates 60a to 60c is set to "1", and this output of "1" is outputted to one of selection signal terminals (SEL) of the slots 100 to 120 through the slot selection signal lines 61a to 61c. That is, any one of the slots 100 to 120 is selected, and thus the CPU 10 is allowed to access any one of the slots 100 to 120.

The slots 100 to 120 are used to install an expanded board 2 or an adapter board 3 (as described later), and the selection signal terminal (SEL), the read/write identification signal terminal (R/W⁻¹(a bar "–" is affixed above "W" in FIG. 6)), the address terminal (A), the data terminal (D) and the response signal terminal (ACK) of each of the slots 100 to 120 are connected to the slot selection signal line 61a (61b, 61c), the read/write identification signal line 26, the address line 11, the data line 12 and the data response signal line 101 (111, 121), respectively.

The OR gate 130 is connected to the data response signal lines 30, 101, 111 and 121 at the input terminals thereof, and also connected to the data response line 15 at the output terminal thereof. When the data response signal is outputted from the control circuit 20 or the slots 100 to 120 (accurately specifying, the boards installed into the slots 100 to 120) to the OR gate 130, the OR gate 130 outputs the data response signal to the CPU 10.

Figure 7:
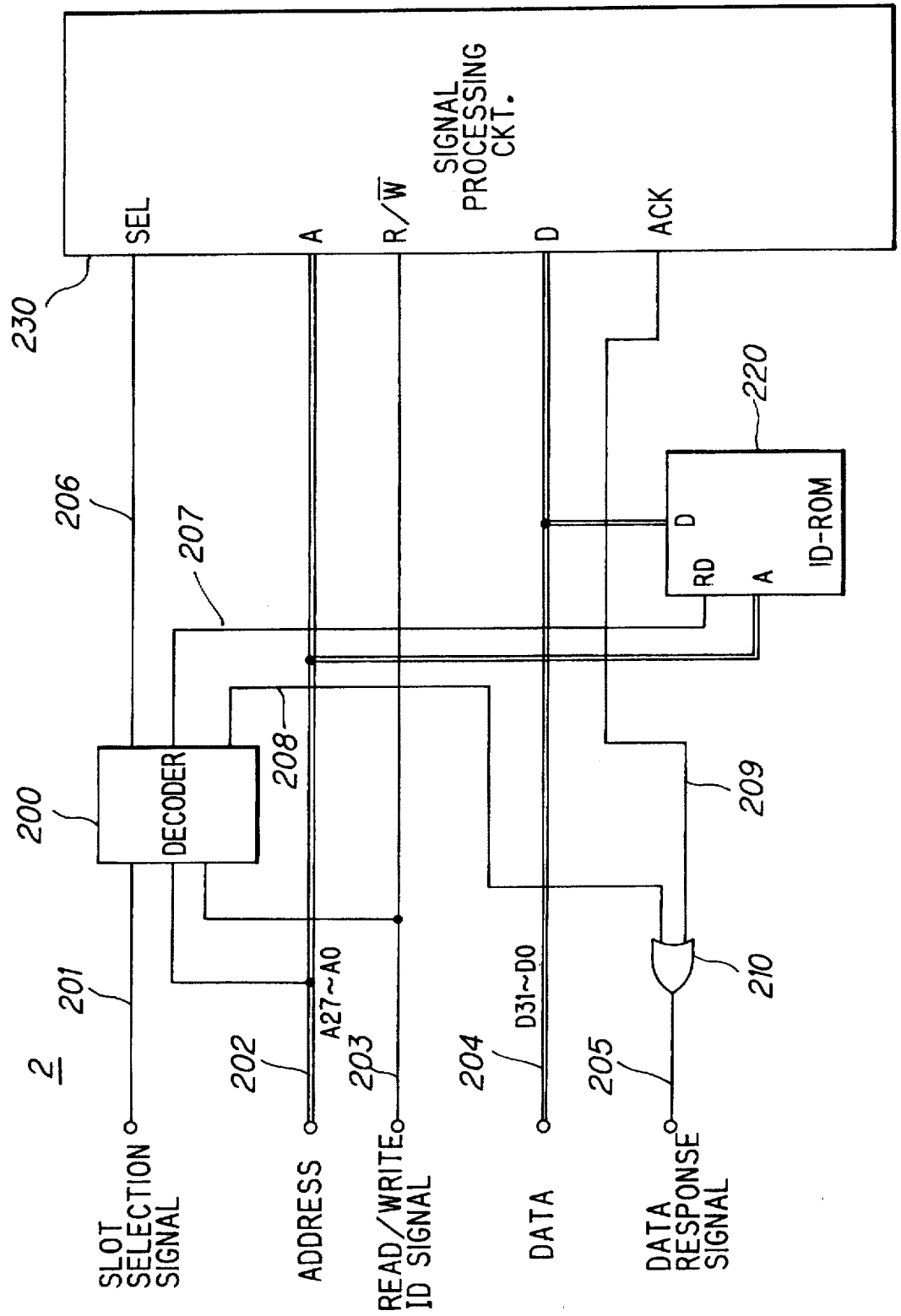
FIG. 7 is a block diagram showing an embodiment of the expanded board according to this invention.

The expanded board to be installed into the slots 100 to 120 is designed as shown in FIG. 7. The expanded board is so designed that when the expanded board is installed into any one of the slots 100 to 120, a slot selection signal line 201, an address line 202, a read/write identification signal line 203, a data line 204 and a data response signal line 205 of the expanded board are connected to the selection signal terminal (SEL), the address terminal (A), the read/write identification signal terminal (R/W⁻¹ (a bar "–" is affixed above "W" in FIG. 7)), the data terminal (D) and the response signal terminal (ACK), respectively.

An ID-ROM 220 comprises a ROM (read only memory), and its address terminal (A), data terminal (D) and read signal terminal (RD) are connected to the address line 202, the data line 204 and the read signal line 207, respectively. In the ID-ROM 220 is memorized the size of the address space occupied by the expanded board 2 (the size of the address space occupied by the expanded board is beforehand written at the top one word of the ROM, for example). An address space occupied by the ID-ROM 220 itself is disposed at the head of the address space occupied by the expanded board 2, for example.

The decoder 200 decodes a part or all of the addresses A27 to A0 supplied through the address line 202 only when supplied with the slot selection signal through the slot selection signal line 201, and on the basis of the decoding result, the decoder 200 outputs a selection signal to the selection signal terminal (SEL) of a signal processing circuit 230 through the selection signal line 206 or outputs a read signal to the read signal terminal (RD) of the ID-ROM 220 through the read signal line 207. When the decoder 200 outputs the read signal to the ID-ROM 220, the decoder 200 outputs the read signal at the timing of the read/write identification signal supplied through the read/write identification signal line 203. Thereafter, upon completion of the access from the computer 1 (FIG. 6) to the ID-ROM 220, the decoder 200 outputs the data response signal through the data response signal line 208, the OR gate 210 and the data response signal line 205.

Here, in order to classify the address space occupied by the expanded board 2 itself, the address bits corresponding to the address space or less must be used. That is, if the expanded board 2 occupies the address space of 1 MB for example, the lower 20 bits of the addresses A27 to A0 (i.e., the addresses A19 to A0) are used to classify the address space occupied by the expanded board 2 itself.

Further, in this case, assuming that, of the address space of 1 MB which is occupied by the expanded board 2, an area from the top to 128 KB corresponds to an address space for the ID-ROM 220, and the residual area of 896 KB corresponds to an address space occupied by the signal processing circuit 230, 17-bits addresses are required to classify the address space of the ID-ROM 220 which is smaller than that of the signal processing circuit 230.

Accordingly, it is sufficient that the decoder 200 decodes only the addresses A19 to A17 of 3 bits (which are obtained by subtracting 17 bits required for classifying the address space of the ID-ROM 220 from 20 bits (the lower bits of the addresses A19 to A0) required for classifying the address space of the expanded board 2.

That is, in this case, if A19=0, A18=0 and A17=0, the decoder 200 identifies the ID-ROM as the access target, and outputs the read signal to the ID-ROM 220. In other cases, that is, if the following condition is satisfied, the decoder identifies the signal processing circuit 230 as the access target, and outputs the selection signal to the signal processing circuit 230:

A19=0, A18=0 and A17=1,
A19=0, A18=1 and A17=0,
A19=0, A18=1 and A17=1,
A19=1, A18=0 and A17=0,
A19=1, A18=0 and A17=1,
A19=1, A18=1 and A17=0, or
A19=1, A18=1 and A17=1.

As is apparent from the foregoing, the address space of the expanded board 2 can be disposed at any position of the I/O address space with reckoning as an unit the size of the address space occupied by the expanded board 2 itself (more accurately, the size obtained by raising to unit the size of the space address occupied by the expanded board 2 so that it is equal to a power-of-two value).

The signal processing circuit 230 has a selection signal terminal (SEL), an address terminal (A), a read/write identification signal terminal (R/W⁻¹ (a bar "–" is affixed above "W" in FIG. 7)), a data terminal (D) and a response signal terminal (ACK) which are connected to the selection signal line 206, the address line 202, the read/write identification signal line 203, the data line 204 and the data response signal line 209, respectively, and carries out a predetermined processing. The OR gate 210 is connected to the data response signal lines 208 and 209 at both input terminals thereof respectively, and also connected to the data response signal line 205 at the output terminal thereof. When the data response signal is outputted from the decoder 200 or the signal processing circuit 230, the OR gate 210 outputs the data response signal through the data response signal line 205.

Figure 8:
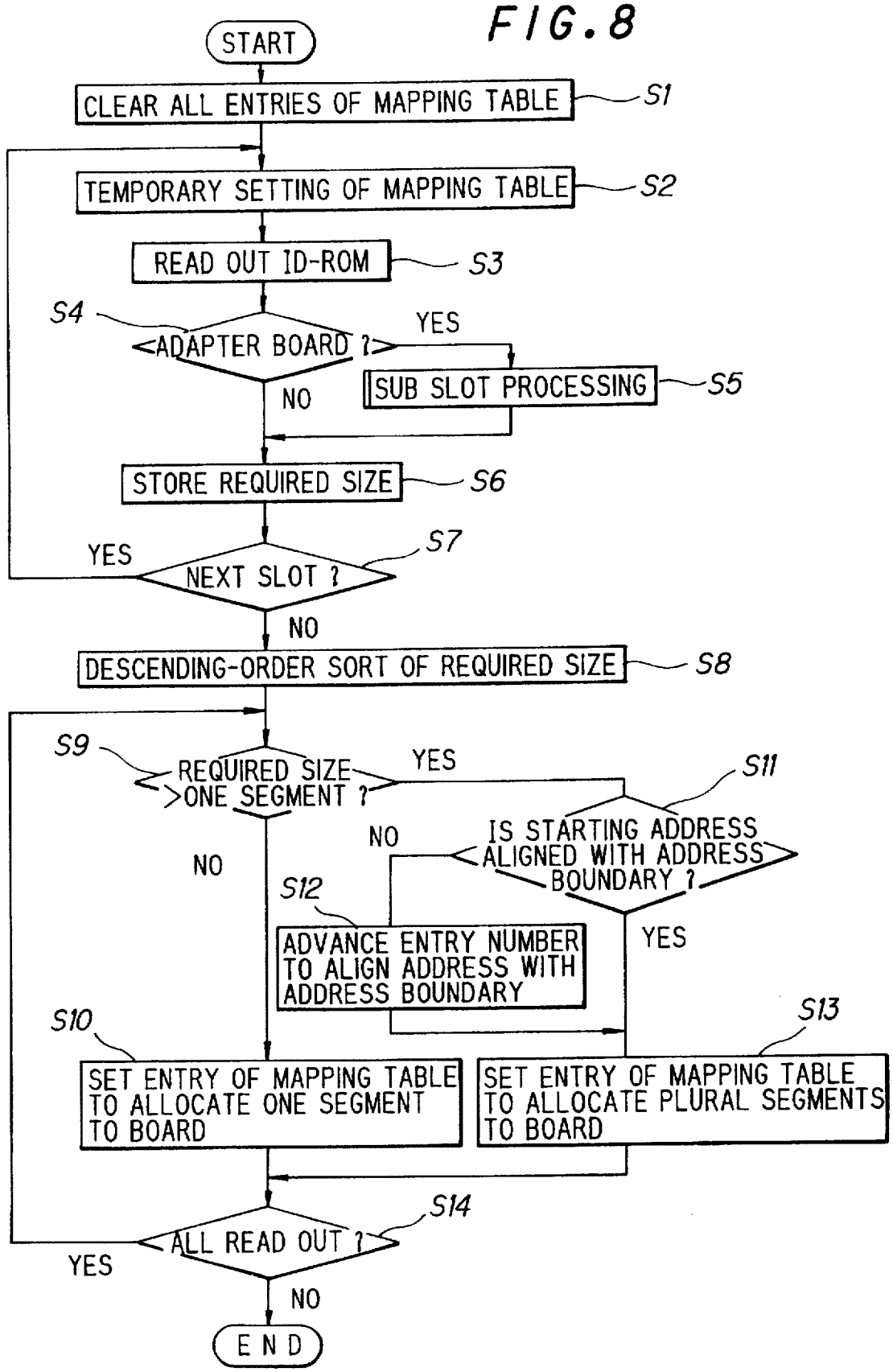
FIG. 8 is a flowchart for the operation of the information processing device as shown in FIG. 1.

When the expanded board 2 thus constructed, or another board having a construction similar to the expanded board 2 is installed into the slots 100 to 120 of the computer 1 (FIG. 6) and the computer 1 is actuated, the allocation program for the I/O address space which is stored in the ROM 90 is read out in the CPU 10, and the processing as shown in the flowchart of FIG. 8 is carried out.

Here, it is assumed that the address space occupied by each of the boards (the expanded board 2 and other similarly-constructed boards) installed into the slots 100 to 120 is designed not to exceed the I/O address space in size (i.e., not greater than 64 MB in this embodiment).

First, at a step S1, all entries in the mapping table 50 are cleared (all of the bits B2 to B0 of each entry are set to "0"). Subsequently, at a step S2, a temporary setting is carried out for the mapping table which is cleared at the step S1, and then the program goes to a step S3 to read out the size of an address space to be occupied, for example, by an expanded board 2 from the ID-ROM 220 (FIG. 7).

At the step S3, when the size of the address space to be occupied by the expanded board 2 installed into the slot 100 is read out from the ID-ROM 220 (FIG. 7), that is, when the expanded board 2 installed into the slot 100 is accessed, as described above, on the basis of a set value of the entry (bits B2 to B0) of the mapping table 50 (FIG. 6), the slot selection signal is outputted from the AND gate 60a to the slot 100 into which the expanded board 2 is installed.

Accordingly, in a state where the device is actuated and all of the entries of the mapping table 50 are cleared at the step S1 as described above, no slot selection signal is outputted from the AND gate 60a, and thus the expanded board installed into the slot 100 cannot be accessed.

Therefore, at the step S2, the temporary setting of the mapping table 50 in which one segment of the I/O address space is temporarily allocated as an address space for the expanded board 2 is carried out.

That is, since the address space of the ID-ROM 220 of the expanded board 2 is allocated at the head of the address space occupied by the expanded board 2 as described above, at the step S2, the setting (temporary setting)(writing) of an entry (first entry) of the mapping table 50 for managing the top segment of the I/O address space is carried out so that a segment having the most suitably ended address (which is the largest power-of-two boundary), that is, the top segment is allocated at the head portion of the address space of the expanded board 2 (the address space of the ID-ROM 220).

The segments of the I/O address space are successively specified as 0-th, first, . . . , 63nd segments by successively counting them from the top segment. That is, the top segment is specified (counted) as a 0-th segment by counting it from the top segment (actually, the top segment corresponds to the first segment from the top segment, however, the above counting manner of the segments is adopted because the relationship between the count number of the segment and the entry number as described later is more easily understood).

Accordingly, irrespective of the size of the address space occupied by the expanded board 2 (under the condition that it must not exceed 64 MB as described above), the access to the ID-ROM 220 can be performed.

Figure 9:
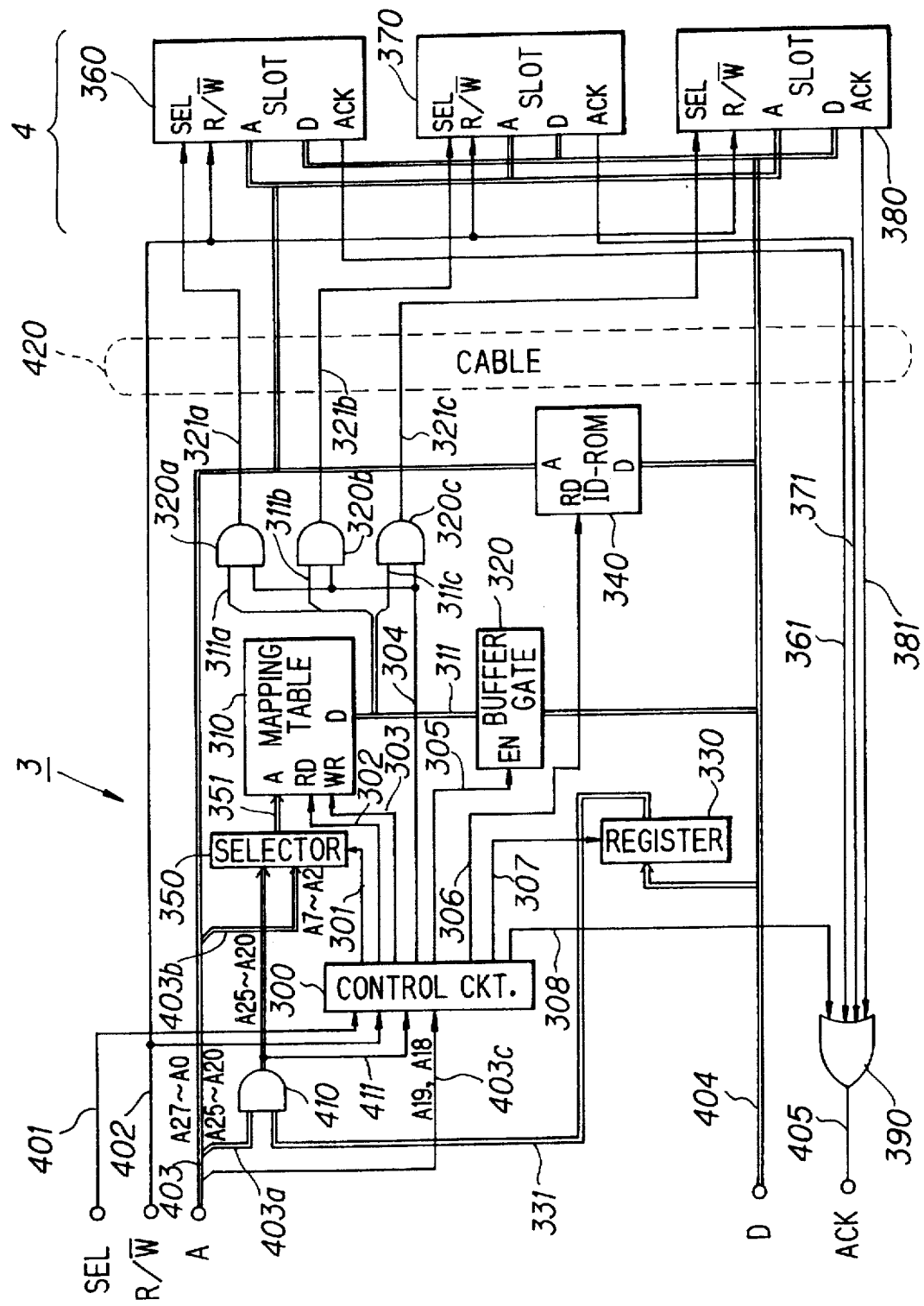
FIG. 9 is a block diagram showing the configuration of an embodiment of the expanding housing system according to this invention.

After the processing at the step S2 as described above, at the step S3, the size of the address space to be occupied by the expanded board 2 is read out from the ID-ROM 220, and the program goes to a step S4 to judge on the basis of the size of the address space read out at the step S3 whether the board installed in the slot 100 (at present, it is assumed that the expanded board 2 is installed) is an adapter board 3 (as described later) as shown in FIG. 9.

If the board installed in the slot 100 is identified as the adapter board 3 at the step S4, the program goes to step S5 to carry out a sub slot processing (as described later), and then the program goes to a step S6.

If the board installed in the slot 100 is not identified as the adapter board 3 at the step S4, the program skips over the step S5, and goes to a step S6. At step S6, the size (required size) of the address space which is to be occupied by the expanded board 2 installed in the slot 100 and read out from the ID-ROM 220 is temporarily stored in the RAM 80 of the computer 1.

Subsequently, the program goes to step S7 to judge whether the identification (read-out) of the size of the address space to be occupied by each of the slots 100 to 120 (accurately, the size of the address space of each of the boards installed in the slots 100 to 120) has been completely made for the slots 100 to 120. If the identification of the size of the address space to be occupied by each of the slots 100 to 120 is judged not to be completely finished at the step S7, the program returns to the step S2 to repeat the processing from the step S2 to S7 until the complete identification of the size of the address space to be occupied by each of the slots 100 to 120 is judged to be finished.

If the identification of the size of the address space to be occupied by each of the slots 100 to 120 is judged to be completely finished at the step S7, the program goes to step S8 so that the size of the address space to be occupied by each of the boards installed in the slots 100 to 120 is re-arranged by size, and then the program goes to a step S9.

At the step S9, the largest size of the address spaces to be occupied by the boards, whose sizes are stored in the RAM 80 in order from large size to small size (hereinafter defined as "in large-to-small size order), is read out from the RAM 80, and it is judged whether the read-out size is not greater than one segment (1 MB). If at the step S9 the largest size of the address spaces to be occupied by the boards which are stored in large-to-small size order in the RAM 80 is judged to be larger than one segment (1 MB), the program successively goes to steps S11 to S13 to perform the entry setting (writing) of the mapping table 50 so that continuous plural segments of the I/O address space are allocated to the board (i.e., the bit (of the bits B2 to B0 of the entry) corresponding to the slot (any one of the slots 100 to 120) into which the board is installed is set to "1").

In this case, at the step S11, it is judged whether the starting address of the address space (the continuous plural segments) to be allocated to the board is aligned with an address boundary of power-of-two which is not less than the size of the address space (the address is aligned). If the starting address of the address space (continuous plural segments) allocated to the board is judged not to be aligned, the program goes to a step S12 to advance the entry number (an index of the entry as an address) so that the starting address of the address space (continuous plural segments) allocated to the board is aligned with an address boundary of power-of-two which is not less than the size of the address space, and then at a step S13, a value setting for the entry is carried out.

If at the step S11 the starting address of the address space (continuous plural segments) allocated to the board is judged to be aligned, the program skips over the step S12, and goes to the step S13 to perform the entry setting of the mapping table 50.

On the other hand, if at the step S9 the largest size of the address spaces to be occupied by the boards which are stored in large-to-small size order in the RAM 80 is judged to be not greater than one segment (1 MB), the program goes to a step S10 to perform the entry setting so that one segment of the I/O address space is allocated to the board (the bit (of the bits B2 to B0 of the entry) corresponding to the slot (any one of the slots 100 to 120) in which the board is installed is set to "1").

An index indicating an entry is successively advanced from the entry position of an entry number "0" as an entry for managing the top segment (the 0-th segment from the top segment) of the I/O address space after the processing as shown in FIG. 8 is started.

After the setting processing of the mapping table 50 at the step S10 or S13, the program goes to a step S14 to judge whether all the sizes of the address spaces occupied by the boards which are stored in large-to-small size order in the RAM 80 are read out. If all the sizes are judged not to be read out at the step S14, the program goes to the step S9 to repeat the processing from the step S9 to S14 until all the sizes of the address spaces to be occupied by the boards which are stored in large-to-small size order in the RAM 80 are judged to be read out at the step S14.

If at the step S14, all the sizes of the address spaces to be occupied by the boards which are stored in large-to-small size order in the RAM 80 are judged to be read out, the processing is ended.

As described above, the address spaces which are required for the boards installed in the slots 100 to 120 are automatically allocated in large-to-small size order from the head of the I/O address space without overlapping one another, so that the user can be relieved from inconvenient tasks.

Further, the expanded boards which are installed into the slots 100 to 120 are generally designed so that the address spaces to be occupied by these boards have power-of-two values. Therefore, as described above, by allocating in large-to-small size order the address spaces occupied by the boards from the head of the I/O address space, in this case, it becomes rarer that the address is not aligned, as compared to the case where the address spaces are allocated on the I/O address space without considering the size of the address spaces.

That is, in the case where boards having address spaces of 4 MB, 16 MB and 32 MB occupied thereby are installed into the slots 100 to 120 respectively, arranging these address spaces in large-to-small size order, the arrangement is 32 MB, 16 MB and 4 MB in this order. If the address spaces are allocated in this order to the I/O address space, the starting addresses of the respective board are 0 MB-th, 32 MB-th and 48(32+16) MB-th from the starting address of the I/O address space, respectively, and thus the alignment is satisfied for all the address spaces.

Accordingly, since the entry number (an index of the entry serving as an address) is rarely advanced (in the above case, since the address is rarely mis-aligned, and thus the entry number is rarely advanced), that is, those portions of the I/O address space which are not used and skipped becomes rare, the I/O address space can be effectively used.

The allocation result of the address space in the above case is as follows.

|  | ALLOCATED ADDRESS SPACE | CORRESPONDING SEGMENT (ENTRY NUMBER) |
| --- | --- | --- |
| BOARD INSTALLED IN SLOT 120 | 32 MB | 0 TO 31 |
| BOARD INSTALLED IN SLOT 110 | 16 MB | 32 TO 47 |
| BOARD INSTALLED IN SLOT 100 | 4 MB | 48 TO 51 |
| UNUSED AREA | 12 MB | 52 TO 63 |

FIG. 9 is a block diagram showing an embodiment of the expanding housing system used when boards whose number is larger than the number of slots provided to the computer 1 are required to be installed. The expanding housing system comprises an adapter board 3 installed in any one of the slots 100 to 120, an expanded housing 4 provided with three sub slots 360 to 380 (sub slots 360, 370 and 380) for example, and a cable 420 for connecting the adapter board 3 and each of the sub slots 360 to 380 of the expanded housing 4.

The adapter board 3 comprises a control circuit 300, a mapping table 310, a buffer gate 320, AND gates 320a to 320c, a register 330, an ID-ROM 340, a selector 350, an OR gate 390, and AND gates 410. When the adapter board 3 is installed into any one of the slots 100 to 120, a selection signal terminal (SEL), a read/write identification signal terminal (R/W$^{-1}$ (a bar "–" is affixed above "W" in FIG. 6), an address terminal (A), a data terminal (D) and a response signal terminal (ACK) of any one of the slots 100 to 120 into which the adapter board 3 is installed are connected to a slot selection signal line 401, a read/write identification signal line 402, an address line 403, a data line 404 and a data response signal line 405, respectively.

Here, it is assumed that in an address spaces to be allocated to the slot (any one of the slots 100 to 120) in which the adapter board 3 is installed, the starting one segment (1 MB) is used by the adapter board 3, and divided as follows.

That is, 512 KB, 256 KB and 256 KB from the top of the address space of 1 MB are allocated to the reading/writing operation for the ID-ROM 340, the register 330 and the mapping table 310.

The register 330 comprises a register of 6 bits, and the following values are set in the register 330 on the basis of the size (occupational size) of an address space which is required to the computer 1 by the expanding housing system as shown in FIG. 9.

| Occupational size | Set value of register 330 |
| --- | --- |
| 1 MB | 000000 |
| 2 MB | 000001 |
| 4 MB | 000011 |
| 8 MB | 000111 |
| 16 MB | 001111 |
| 32 MB | 011111 |
| 64 MB | 111111 |

Here, the occupational size, 1 MB, 2 MB, 4 MB, 8 MB, 16 MB, 32 MB and 64 MB mean that the size of the address space required to the computer 1 by the expanding housing system is not greater than 1 MB, over 1 MB and not greater than 2 MB, over 2 MB and not greater than 4 MB, over 4 MB and not greater than 8 MB, over 8 MB and not greater than 16 MB, over 16 MB and not greater than 32 MB and over 32 MB and not greater than 64 MB, respectively.

The value setting (writing) into the register 330 is carried out from the computer 1 through the data line 404, and the set values are input through the gate signal line of 6 bits into one input terminal of the AND gates 410.

The AND gates 410 are connected to an address line 403a of the address line 403 at the other input terminal thereof, and supplied with the addresses A25 to A20 from the computer 1. The AND gates 410 are further connected to one input terminal of the selector 350 and the control circuit 300 through the address line 411 at the output terminal thereof. The AND gates 410 mask the addresses A25 to A20 with the set values of the register 330, and output them to the selector 350 and the control circuit 300.

The selector 350 is connected to an address line 403b of the address line 403 at the other input terminal, and supplied with addresses A7 to A2 through the other input terminal. In accordance with a control signal supplied by the control circuit 300 through the control signal line 301, one of two address groups, one of which comprises the addresses A25 to A20 supplied to the one input terminal of the selector 350 and the other of which comprises the addresses A7 to A2 supplied to the other input terminal of the selector 350 is outputted to the address terminal (A) of the mapping table 310 through the address line 351.

The mapping table 310 comprises a RAM, and has an address terminal (A), a data terminal (D), a read signal terminal (RD) and a write signal terminal (WR) which are connected to an address line 351, a data line 311, a read signal line 302 and a write signal line 303, respectively. The mapping table 310 is used to set (store) the corresponding relationship between an address output from the computer 1 (CPU 10) when it accesses any one of the sub slots 360 to 380, and a sub slot selection signal output from one of AND gates 320a, 320b and 320c through one of slot selection signal lines 321a to 321c to any one of the selection signal terminals (SEL) of the sub slots 360 to 380.

That is, like the mapping table 50 as shown in FIG. 6, the mapping table 310 manages the maximum address space of 64 MB which can be required to the computer 1 by the expanding housing system as shown in FIG. 9 while dividing the address space into 64 segments each comprising 1 MB.

When the read/write operation of the mapping table 310 itself (bits B2 to B0 of each entry) is carried out by the computer 1, for example, 6 bits of the addresses A7 to A2 are used as an index (address) of each entry in order to enable the access to all of 64 entries of the mapping table 310. In addition, in order to access the addresses sub slots 360 to 380, for example, 6 bits of the addresses A25 to A20 are used as an index (address) of each entry when an entry (bits B2 to B0 of the entry) of the mapping table 310 is read out.

Since the address space of 1 MB used by the adapter board 3 is disposed at the head of the address space occupied by the expanding housing system as described above, the entry at the head of the mapping table 310 (the entry of entry number "0") is neglected (cannot be used) when the computer 1 accesses the sub slots 360 to 380.

Further, in this case, 6 bits of the addresses A25 to A20 are used as an address serving as an index for specifying the entry of the mapping table 310 as described above. However, these bits are masked with the set value of the register 330 in the AND gates 410 and supplied to the mapping table 310 through the address line 411, the selector 350 and the address line 351, and thus effective lower-limit and upper-limit numbers of entries are set to the following values.

| Occupational size | Set value of register 330 | Lower-limit of entry | Upper-limit of entry |
|---|---|---|---|
| 1 MB | 000000 | — | — |
| 2 MB | 000001 | 1 | 1 |
| 4 MB | 000011 | 1 | 3 |
| 8 MB | 000111 | 1 | 7 |
| 16 MB | 001111 | 1 | 15 |
| 32 MB | 011111 | 1 | 31 |
| 64 MB | 111111 | 1 | 63 |

Numerals at the lower limit and the upper limit of the entries represent "entry numbers" when the head of the mapping table 310 is set to "0-th".

The ID-ROM 340 comprises a ROM, and has an address terminal (A), a data terminal (D) and a read signal terminal (RD) which are connected to the address line 403, the data line 404 and the read signal line 306, respectively. In the ID-ROM 340 is memorized information identifying the adapter board 3 to be an adapter board (in the ID-ROM 220 of the expanded board 2 as shown in FIG. 7, the size of the address space is written at the top one word of the ID-ROM 220. However, in the ID-ROM 340, for example, "0" is beforehand written at the top one word of the ID-ROM 340).

Like the ID-ROM 220 as shown in FIG. 7, the address space occupied by the ID-ROM 340 itself is disposed at the head of the address space occupied by the adapter 3.

The control circuit 300 is connected to the slot selection signal line 401, and it is actuated only when supplied with the slot selection signal from the computer 1. The control circuit 300 is connected to the address line 403a of the address line 403 through the AND gates 410 and the address line 411 and the address line 403c of the address line 403 to be supplied with the addresses A25 to A20 (accurately, the addresses A25 to A20 which have been masked with the set value of the register 330 in the AND gates 410)(hereinafter referred to as "masked addresses A25 to A20"), or the addresses A19 and A18.

When supplied with the slot selection signal from the computer 1, the control circuit 300 judges the access target of the computer 1 on the basis of the masked addresses A25 to A20 or the addresses A19 and A18, and carries out the following processing.

For example, when all the masked addresses A25 to A20 are equal to "0" and the address A19 is equal to "0", the control circuit 300 identifies the ID-ROM 340 as the access target to output the read signal through the read signal line 306 to the read signal terminal (RD) of the ID-ROM 340 at the timing of the read/write identification signal which is supplied from the computer 1 through the read/write identification signal line 402. Subsequently, upon completion of the access to the ID-ROM 340, the control circuit 300 outputs the data response signal through the data response signal line 308, the OR gate 390 and the data response signal line 405.

Further, when all the masked addresses A25 to A20 are equal to "0" and the address 19 and A18 are equal to "1" and "0" respectively, the control circuit 300 identifies the register 330 as the access target to output the write signal through the write signal line 307 to the register 330 at the timing of the read/write identification signal which is supplied through the read/write identification signal line 402 from the computer 1. Subsequently, upon completion of the access to the register 330, the control circuit 300 outputs the data response signal to the computer 1 through the data response signal line 308, the OR gate 390 and the data response signal line 405.

Still further, when all the masked addresses A25 to A20 are equal to "0" and both of the addresses A19 and A18 are equal to "1", the control circuit 300 identifies the mapping table 310 as the access target to produce a read or write signal on the basis of the read/write identification signal supplied through the read/write identification signal line 402 from the computer 1, and output it through the read signal terminal (RD) or the write signal terminal (WR) of the mapping table 310 through the read signal line 302 or the write signal line 303.

At the same time, the control circuit 300 outputs a control signal through the control signal line 301 to the selector 350 so that the selector 350 selects the addresses A7 to A2 of the masked addresses A25 to A20 and the addresses A7 to A2 which are input to the selector 350, and also the control circuit 300 outputs an enable signal through the control signal line 305 to the buffer gate 320.

The buffer gate 320 is disposed between the data line 311 extending from the mapping table 310 and the data line 404 connected to the data line 12 of the computer 1, and like the buffer gate 70 as shown in FIG. 6, normally it serves to electrically separate the data lines 311 and 404 (keep the data lines 311 and 404 in the electrically disconnected state). However, when supplied with the enable signal from the control circuit 300 through the control signal line 305, the buffer gate 320 serves to connect the data line 311 to the data line 404 (put the data lines 311 and 404 in the electrically connected state).

Accordingly, when the enable signal is outputted from the control circuit 300 to the buffer gate 320, the access from the computer 1 to the mapping table 310 can be carried out. Upon completion of the access to the mapping table 310, the control circuit 300 outputs the data response signal to the computer 1 through the data response signal line 308, the OR gate 390 and the data response signal line 405.

When all the masked addresses A25 to A20 are not equal to "0", the control circuit 300 identifies the slots 360 to 380 (accurately, the boards installed into the slots) as the access target, and first outputs the read signal through the read signal line 302 to the read signal terminal (RD) of the mapping table 310.

At the same time, the read/write identification signal is outputted from the computer 1 through the read/write identification signal line 402 to the read/write identification signal terminals (R/W$^{-1}$ (a bar "−" is affixed above "W" in FIG. 9) of the slots 360 to 380.

Subsequently, the control circuit 300 outputs a control signal to the selector 350 through the control signal line 301 so that the selector 350 selects the masked addresses A25 to A20 of the masked addresses A25 to A20 and the addresses A7 to A2 which are input to the selector 350, and outputs the selected addresses through the address line 351 to the mapping table 310. Through this operation, the masked addresses A25 to A20 are outputted from the selector 350 through the address line 351 to the mapping table 310, and bits B0 to B2 of an entry indexed by these masked addresses A25 to A20 are outputted to one of the input terminals of each of the AND gates 320a to 320c through the 3-bit data line 311 and the one-bit data lines 311a to 311c constituting the data line 311.

Here, the AND gates 320a to 320c correspond to the AND gates 60a to 60c as shown in FIG. 6. If the address space managed by an entry of the mapping table 310 which is indexed by the addresses A25 to A20 output from the selector 350 is allocated to one of the slots 360 to 380, any one of the bits B0 to B2 is equal to "1". Therefore, in this case, one of the AND gates 320a to 320c is set to "1" at the input terminal thereof.

At the same time, the control circuit 300 outputs an enable signal (whose value is "1") through the control signal line 304 to each of the other input terminals of the AND gates 320a to 320c. Through this operation, all the AND gates 320a to 320c are set to "1" at the other input terminals thereof. Accordingly, any one of the outputs of the AND gates 320a to 320c is equal to "1", and this "1" output is supplied to any one of the selection signal terminals (SEL) of the slots 360 to 380 through any one of the sub slot selection signal lines 321a to 321c. That is, through the above operation, any one of the slots 360 to 380 is selected, and the computer 1 is allowed to perform the access operation.

The sub slots 360 to 380 are designed in the same configuration as the slots 100 to 120 as shown in FIG. 6 (the term "sub slot" is used in order to differentiate from the slots 100 to 120 of the computer (FIG. 6)), and each slot has a selection signal terminal (SEL), a read/write identification signal terminal (R/W$^{-1}$ (in the figure, a bar "−" is affixed above "W")), an address terminal (A), a data terminal (D) and a response signal terminal (ACK) which are connected to the slot selection signal line 321a (321b, 321c), the read/write identification signal line 402, the address line 403, the data line 404 and the data response signal line 361 (371, 381). These slots are used to install an expanded board (which is designed in the same configuration as the expanded board 2) or an adapter board (which is designed in the same configuration as the adapter board 3).

The OR gate 390 corresponds to the OR gate 130 as shown in FIG. 6, and its input terminal is connected to the data response signals 308, 361, 371 and 381, and its output terminal is connected to the data response line 405. When the data response signal is outputted from the control circuit 300 or the sub slots 360 to 380 (accurately, the boards installed into the sub slots 360 to 380), the OR gate 390 outputs the data response signal to the computer 1.

In the case where the adapter board 3 thus constructed is installed into any one of the slots 100 to 120 of the computer 1, and a board having the same configuration as the expanded board 2 or a board having the same configuration as the adapter board 3 is installed into any one of the slots 360 to 380 of the expanded housing 4 which is connected through the cable 420 to the adapter 3, at the step S3 of the flowchart of FIG. 8, "0" corresponding to the size of the address space occupied by the adapter board 3 is read out from the ID-ROM 340 of the adapter board 3 (because the size of the address space occupied by the adapter board 3 is 1 MB as described above, however, "0" is written in the ID-ROM 340).

There is no case where the size of the address space occupied by the board installed into any one of the slots 100 to 120 of the computer 1 is equal to "0", and thus the computer 1 identifies the board as the adapter board which is connected to the expanded housing 4 through the cable 420.

That is, when "0" is read out from the ID-ROM 340 at the step S3 (FIG. 8), the board having the ID-ROM 340 is identified as the adapter board at the step S4, and the program goes to the step S5 to carry out the sub slot processing.

Figure 10:
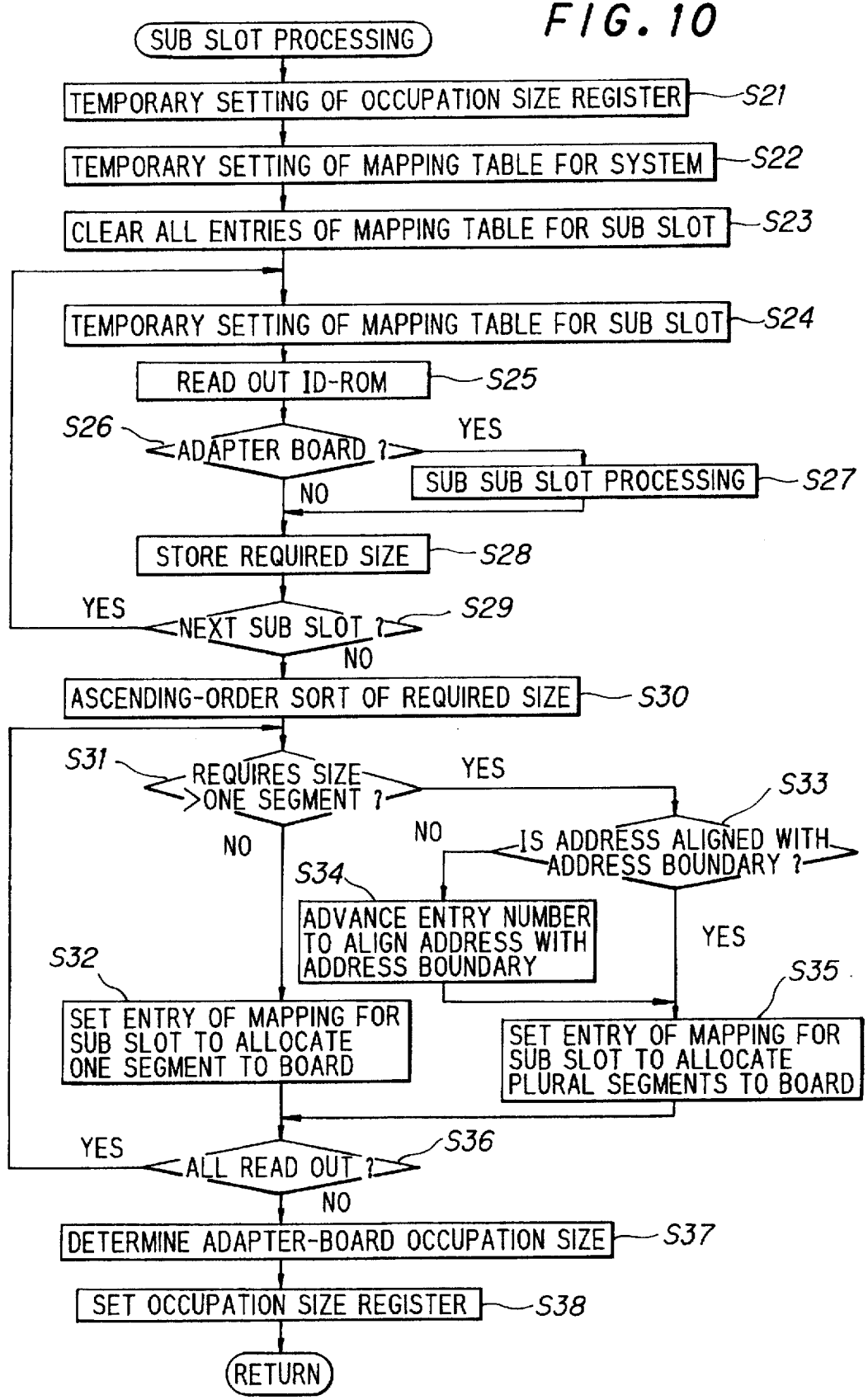
FIG. 10 is a detailed flowchart for the processing at a step S5 of the flowchart as shown in FIG. 8.

At the step S5, "111111" is set in the register 330 (FIG. 9) at a step S21 of FIG. 10, and the size of the address space occupied by the expanding housing system as shown in FIG. 9 (required to the computer 1) is set to 64 MB.

The address space of the adapter board 3 is allocated to the head of the address space occupied by the expanding housing system as shown in FIG. 9. Therefor, similarly in the read-out processing of the ID-ROM 220 (FIG. 7) at the step S3 (FIG. 8), at the step S21 the access to the register 330 is carried out using a first segment (the top segment of the I/O address space of 64 MB of the computer 1) which is allocated to the head portion of the address space of the adapter board (expanding housing system) at the step S2 (FIG. 8).

After the processing at the step S21, the program goes to a step S22, and like the step S2 as shown in FIG. 8, the setting (temporary setting) of an entry (second entry) of the mapping table 50 for managing a second segment of the I/O address space is carried out so that a 32nd segment from the top segment of the I/O address space of 64 MB of the computer (main body) 1 (actually, this segment corresponds to a 33-th segment from the top segment. However, the top segment is counted (numbered) as a 0-th segment, and thus the segment is counted (numbered) as the 32nd segment from the top segment) (second segment) is allocated to the head portion of the address space of the board (having the same configuration as the expanded board 2 or adapter board) which is installed into any one of the sub slots 360 to 380, and then the program goes to a step S23.

Here, the address space occupied by each of the boards (having the same configuration as the expanded board 2 or adapter board 3) installed into the slots 360 to 380 is set to a half or less of the size of the I/O address space, that is, not greater than 32 MB in this embodiment.

At the step S23, all of the entries of the mapping table 310 are cleared (all bits B2 to B0 of each entry are set to "0"), and the program goes to a step S24 to carry out the temporary setting of the mapping table 310 in the same manner as the temporary setting processing of the mapping table 50 (FIG. 6) at the step S2 of FIG. 8.

That is, when the board (having the same configuration as the expanded board 2 or adapter board 3) installed into any one of the sub slots 360 to 380 is accessed, the sub slot selection signal is outputted to any one of the slots 360 to 380 on the basis of the set value of the entry (bits B2 to B0) of the mapping table 310 (FIG. 9) as described above.

Accordingly, in the state where the device is started and all the entries of the mapping table are cleared at the step S23 as described above, the access to the boards (having the same configuration as the expanded board 2 or adapter board 3) installed into the sub slots 360 to 380 cannot be performed.

At the step S24, the computer 1 carries out the access operation to the mapping table 310 of the adapter board 3 using the first segment of the mapping table 50 to carry out the setting (the temporary setting) of a 32nd entry of the mapping table 310 (an entry of entry number "32") (like the segment as described above, actually, this entry corresponds to a 33rd entry from the top entry. However, the top entry is counted up as a 0-th entry (an entry of entry number "0"), and thus this entry is counted up as the 32nd entry from the top entry).

Accordingly, irrespective of the size of the address space (under the condition that it is not greater than 32 MB as described above) occupied by each of the boards (having the same configuration as the expanded board 2 or adapter board 3) installed into the sub slots 360 to 380, each board can be accessed (the sub slot selection signal is outputted to the AND gates 320a through 320c).

Subsequently, at a step S25, the size of the address space occupied by the board (having the same configuration as the expanded board 2 or adapter board 3) installed into the sub slot 360, for example, serving as a first sub slot of the sub slots 360 to 380 is read out, and then the program goes to a step S26 to judge on the basis of the size of the address space read out at the step S25 whether the board (having the same configuration as the expanded board 2 or adapter board 3) installed into the sub slot 360 is a board having the same configuration as the adapter board 3 (is designed to have the same configuration as the adapter board 3).

If at the step S26 the board installed into the sub slot 360 is judged to be the board having the same configuration as the adapter board 3, the program goes to a step S27 to carry out a sub sub slot processing (as described later), and then goes to a step S28.

If at the step S26 the board installed into the sub slot 360 is judged not to be designed in the same configuration as the adapter board 3, that is, the board installed into the sub slot 360 is judged to be designed in the same configuration as the expanded board 2, the program skips over a step S27, and goes to a step S28, so that the size of the address space (required size) which is read out from the board (having the same configuration as the expanded board 2) installed into the sub slot 360 and to be occupied by the board is temporarily stored in the RAM 80 (FIG. 6) of the computer 1.

Subsequently, the program goes to a step S29 to carry out a judgment for the sub slots 360 to 380 whether the identification (read out) of the size of the address spaces to be occupied by these slots 360 to 380 (accurately, the size of the address spaces to be occupied by the boards installed into the slots 360 to 380) is completed. If the identification of the size of the address spaces to be occupied by the slots 360 to 380 is judged not be completed at the step S29, the program returns to the step S24 to repeat the processing from the step S24 again.

If the identification of the size of the address spaces to be occupied by the slots 360 to 380 is judged to be completed at the step S29, the program goes to a step S30 to re-arrange in order from small size to large size (hereinafter referred to as "small-to-large size order") the sizes of the address spaces to be occupied by the boards installed into the slots 360 to 380, which are stored in the RAM 80, and then goes to step S31. At step S31, the smallest size of the address spaces to be occupied by the boards which are stored in the RAM 80 in small-to-large size order is read out from the RAM 80 to judge whether the read-out size is not greater than one segment (1 MB). If the smallest size of the address spaces to be occupied by the boards is judged to be larger than one segment (1 MB), the program successively goes from the step S33 to the step S35 to carry out the entry setting of the mapping table 310 for managing the segments so that the continuous plural segments are allocated to the board (of the bits B2 to B0 of the entry, the bit corresponding to the sub slot installed into the board (any one of the sub slots 360 to 380) is set to "1").

In this case, at step S33, it is judged whether the top address of the address space (continuous plural segments) allocated to the board is aligned with a power-of-two boundary which is not less than the size of the address space. If at the step S33 the top address of the address space (continuous plural segments ) allocated to the board is judged not to be aligned with the power-of-two boundary which is not less than the size of the address space, the program goes to a step S34 to advance the entry number (an index of the entry serving as an address) of the mapping table 310 so that the top address of the address space (continuous plural segments) allocated to the board is aligned with the power-of-two boundary which is not less than the size of the address space, and then at the step S35 the setting of the mapping table 310 as described above is carried out.

If at step S33 the top address of the address space (continuous plural segments) allocated to the board is judged to be aligned with the power-of-two boundary which is not less than the size of the address space, the program skips over the step S34 and goes to the step S35 to carry out the setting of the mapping table 310 as described above.

On the other hand, if at the step S31 the smallest size of the address spaces to be occupied by the boards which are stored in the RAM 80 in small-to-large size order is judged to be not greater than one segment (1 MB), the program goes to the step S32 to carry out the entry setting so that one segment is allocated to the board (of the bits B2 to B0 of the entry, the bit corresponding to the sub slot (any one of the sub slots 360 to 380) into which the board is installed is set to "1").

After the setting processing of the mapping table 310 at the step S32 or S35, the program goes to a step S36 to judge whether all the sizes of the address spaces to be occupied by the boards which are stored in the RAM 80 in small-to-large size order are read out. If the judgment at the step S36 is "No", the program returns to the step S31 to repeat the processing from the step S31 to S36 until all the sizes of the address spaces to be occupied by the boards which are stored in the RAM 80 in small-to-large size order are read out.

Here, since the address space occupied by the adapter board 3 is disposed at the top one segment (1 MB) of the address space occupied by the expanding housing system as shown in FIG. 9 as described above, unlike the processing as shown in the flowchart of FIG. 8, the number of those address spaces (entry number which is advanced to align an address) which are skipped without being used is reduced by allocating the address spaces occupied by the boards installed into the expanded housing 4 in small-to-large size order from the top of the address space occupied by the expanding housing system as shown in FIG. 9, and thus the address space can be effectively used.

After the setting of the mapping table 310 as described above, the program goes to a step S37 to calculate a total value of the address space occupied by the adapter board 3, the address spaces occupied by the boards installed into the expanded housing 4 and the address spaces which are skipped to align the addresses, and then the program goes to a step S38 while this total value is set as the size (required size) of the address space occupied by the expanding housing system.

At the step S38, the value setting of the register 330 as described above is carried out on the basis of the minimum power-of-two value which is not less than the size (required size) of the address space calculated at the step S37, and then the processing is terminated.

After the processing from the step S21 to S38 is terminated, that is, after the step S5 as shown in FIG. 8, the required size calculated at the step S37 (the size of the address space occupied by the expanding housing system) is delivered to the processing at the step S6 (FIG. 8).

Through the processing as shown by the flowchart of FIGS. 8 and 10 as described above, in the following case:

adapter board 3 is installed into slot 100 of computer (main body) 1, expanded board A of address space 4 MB is installed into slot 110 of computer 1, expanded board B of address space 16 MB is installed into slot 120 of computer 1, expanded board C of address space 8 MB is installed into sub slot 360 of expanded housing 4 connected to adapter board 3, expanded board D of address space 4 MB is installed into sub slot 370 of expanded housing 4, and expanded board E of address space 16 MB is installed into sub slot 380 of expanded housing 4, the address spaces are allocated as follows.

That is, first the board installed into the slot 100 is identified as the adapter 3 (step S4), and then the sub slot processing (step S5) is carried out. Subsequently, through the sub slot processing, the address spaces occupied by the expanded boards C, D and E installed into the expanded housing 4 are arranged in small-to-large size order and so that the addresses thereof are aligned with one another (steps S30 to S38), and the arrangement result is as follows:

| address space of adapter board 3 | 1 MB |
| unused area | 3 MB |
| address space of expanded board D | 4 MB |
| address space of expanded board C | 8 MB |
| address space of expanded board E | 16 MB |

The address space occupied by the expanding housing system is 32 (=1+3+4+8+16) MB.

Further, the address spaces of the expanding housing system, the expanded boards A and B are arranged in large-to-small size order and so that the addresses thereof are aligned with one another (steps S8 to S14), and finally the addresses are allocated as follows:

| address space of expanding housing system | 32 MB |
| (address space of adapter board 3 | 1 MB |
| unused area | 3 MB |
| address space of expanded board D | 4 MB |
| address space of expanded board C | 8 MB |
| address space of expanded board E | 16 MB) |
| address space of expanded board B | 16 MB |
| address space of expanded board A | 4 MB |
| unused area | 12 MB |

When the following case is satisfied:

the adapter board 3 is installed into the slot 100 of the computer (main body) 1, the expanded board A of address space 4 MB is installed into the slot 110 of the computer 1, the expanded board B of address space 8 MB is installed into the slot 120 of the computer 1, the expanded board C of address space 16 MB is installed into the slot 360 of the expanded housing 4 connected to the adapter board 3, the expanded board D of address space 16 MB is installed into the slot 370 of the expanded housing 4, and the expanded board E of address space 8 MB is installed into the sub slot 380 of the expanded housing 4, the address spaces are allocated as follows.

That is, the board installed into the slot 100 is identified as the adapter board 3, and then sub slot processing is carried out. Through the sub slot processing, the address spaces of the expanded boards C, D and E installed into the expanded housing 4 are arranged in small-to-large size order and so the addresses thereof are aligned with one another. The arrangement result is as follows:

| address space of adapter board 3 | 1 MB |
| unused area | 7 MB |
| address space of expanded board E | 8 MB |
| address space of expanded board C | 16 MB |
| address space of expanded board D | 16 MB |

The address space occupied by the expanding housing system is 48 (=1+7+8+16+16) MB.

Further, the address spaces of the expanding housing system and the expanded boards A and B are arranged in large-to-small size order and so that the addresses thereof are aligned with one another, and finally the address spaces are allocated as follows:

| address space of expanding housing system | 48 MB |
| (address space of adapter board | 1 MB |
| unused area | 7 MB |
| address space of expanded board E | 8 MB |
| address space of expanded board C | 16 MB |
| address space of expanded board D | 16 MB) |
| address space of expanded board B | 8 MB |
| address space of expanded board A | 4 MB |
| unused area | 4 MB |

In this case, an address space of 48 MB is allocated to the expanding housing system, and as described above (at the step S38 (FIG. 10)), the value (=111111) corresponding to 64 MB which is the minimum power-of-two value not less than the size of the address space is set to the register 330 of the adapter board 3.

As described above, in the expanding housing system as shown in FIG. 9, the address spaces required for the boards installed into the sub slots 360 to 380 are automatically allocated without being overlapped with one another, so that the boards installed into the slots can be used even if the address spaces occupied by these boards are large.

Figure 12:
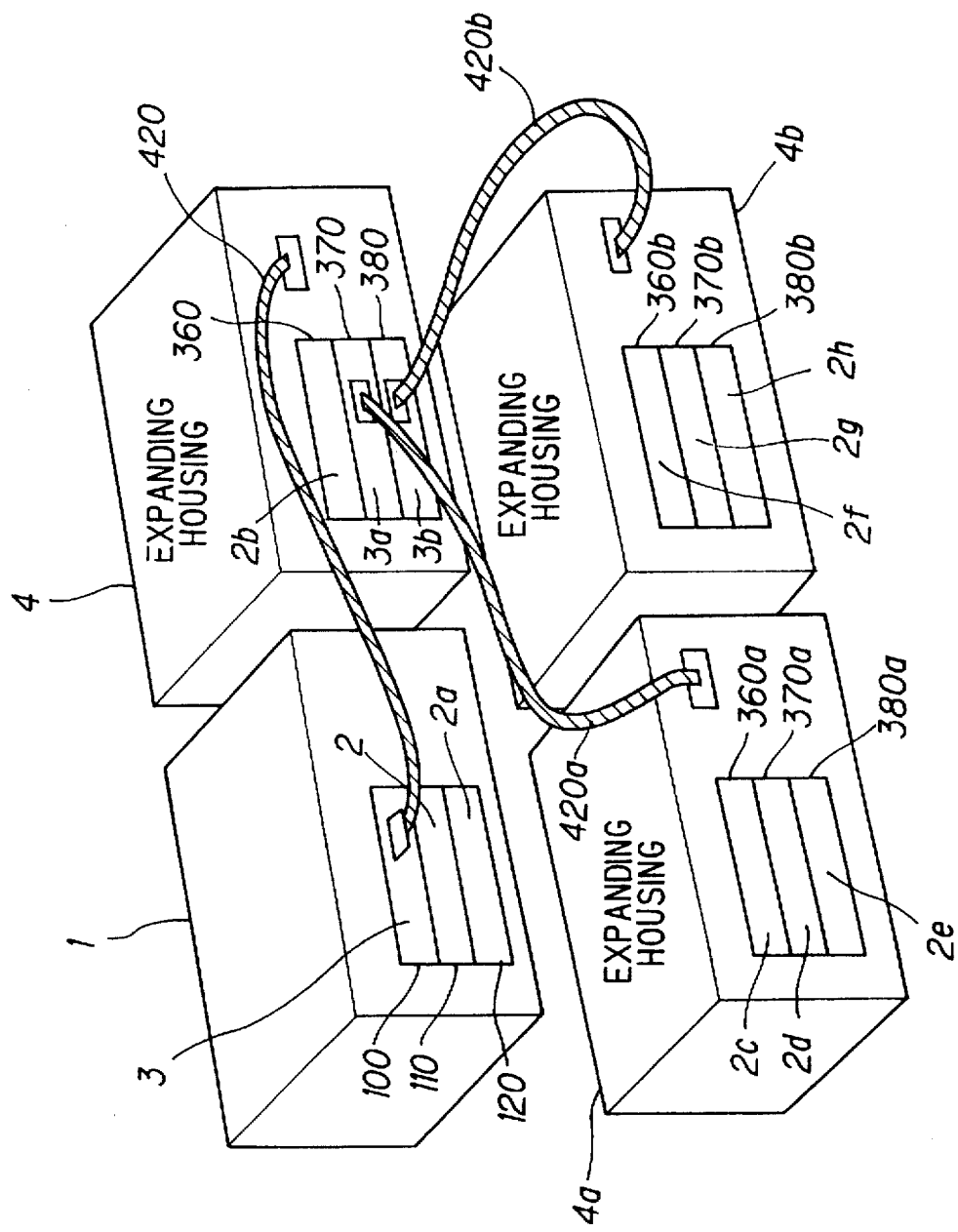
FIG. 12 is a perspective view of the information processing device to which cascade-connected expanding housing systems are connected.

Further, in the expanding housing system as shown in FIG. 9, the hierarchical cascade-connection can be performed. That is, for example, the following connection as shown in FIG. 12 can be performed:

the adapter board 3 (FIG. 9) is installed into the slot 100 of the computer 1, the expanding board 2 (FIG. 7) is installed into the slot 110 of the computer 1, an expanded board 2a having the same configuration as the expanded board 2 is installed into the slot 120 of the computer 1, an expanded board 2b having the same configuration as the expanded board 2 is installed into a sub slot 360 of the expanding housing 4 connected thorough the cable 420 to the adapter board 3, an adapter board 3a having the same configuration as the adapter board 3 is installed into a sub slot 370 of the expanding housing 4, an adapter board 3b having the same configuration as the adapter board 3 is installed into a sub slot 380 of the expanding housing 4, an expanded board 2c having the same configuration as the expanded board 2 is installed into a sub sub slot 360a of an expanding housing 4a having the same configuration as the expanding housing 4, which is connected to the adapter board 3a through a cable 420a having the same configuration as the cable 420, an expanded board 2d having the same configuration as the expanded board 2 is installed into a sub sub slot 370a of the expanding housing 4a, an expanded board 2e having the same configuration as the expanded board 2 is installed into a sub sub slot 380a of the expanding housing 4a, an expanded board 2f having the same configuration as the expanded board 2 is installed into a sub sub slot 360b of an expanding housing 4b having the same configuration as the expanding housing 4, which is connected to the adapter board 3b through a cable 420b having the same configuration as the cable 420, an expanded board 2g having the same configuration as the expanded board 2 is installed into a sub sub slot 370b of the expanding housing 4b, and an expanded board 2h having the same configuration as the expanded board 2 is installed into a sub sub slot 380b of the expanding housing 4b.

The slots of the expanding housing 4a and 4b which are cascade-connected to the expanding housing 4 (expanding housing system) are referred to as "sub sub slot" in order to discriminate these slots from the slots 100 to 120 of the computer 1 and the sub slots 360 to 380 of the expanding housing 4 which are directly connected to the computer 1. Hereinafter, the expanding housing system comprising the adapter board 3a (3b), the cable 420a (420b) and the expanding housing 4a (4b) is referred to as "expanding housing system A (B)".

In this case, at the step S26 of the flowchart of FIG. 10 as described above, the board (adapter board 3a (or 3b)) installed into the sub slot 370 (or 380) is identified as the adapter board, and the sub sub slot processing at the step S27 is carried out.

Here, the address space occupied by each board installed into the expanding housing system A or B is set to a quarter or less of the size of the I/O address space, that is, not larger than 16 MB in this embodiment.

Figure 11:
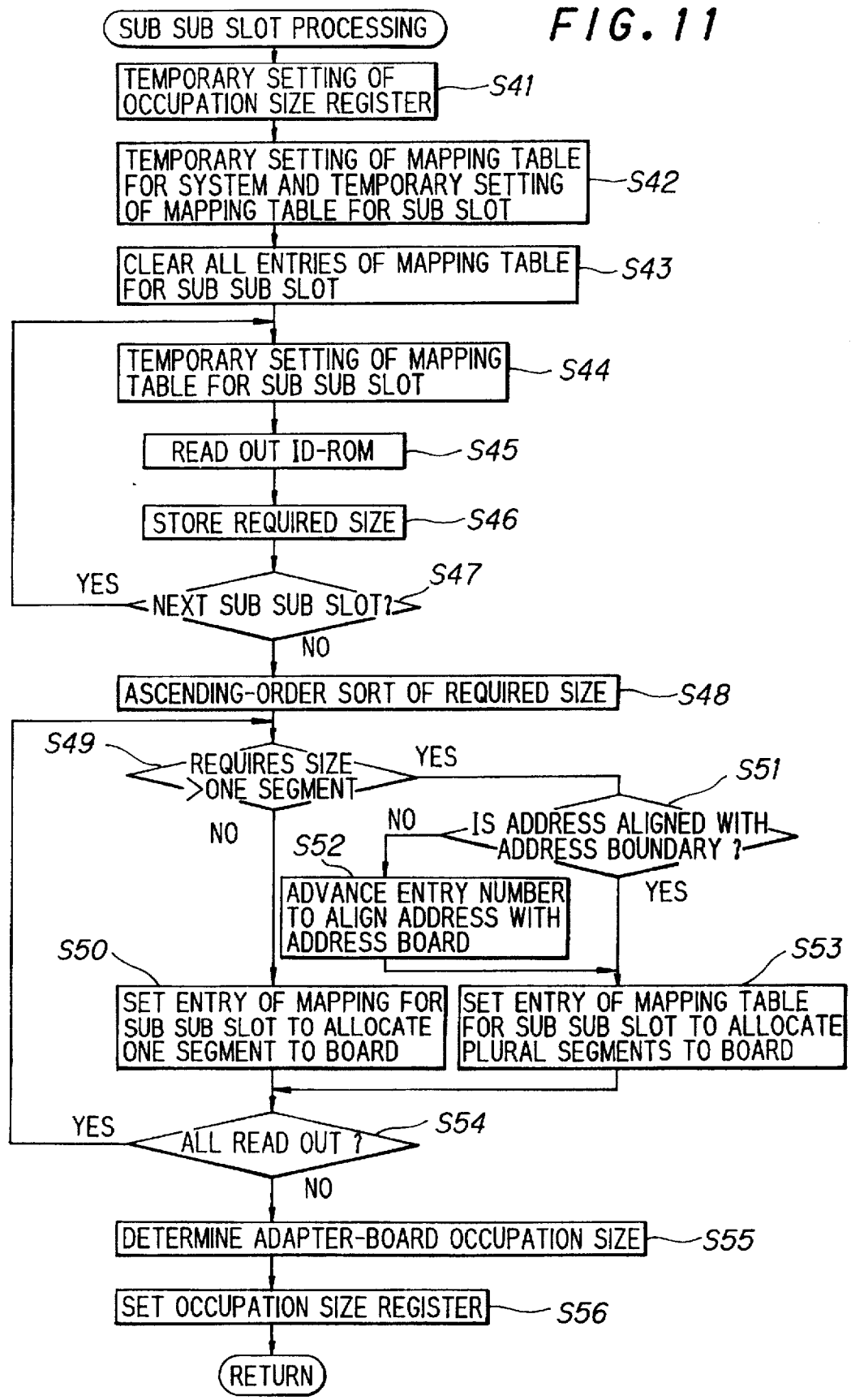
FIG. 11 is a detailed flowchart for the processing at a step S27 of the flowchart as shown in FIG. 10.

As shown in the flowchart of FIG. 11, the sub sub slot processing at the step S27 comprises the steps S41 to S56, and this processing is carried out in the same manner as the processing from the step S21 to S25 or from S28 to S38. Even if the expanding housing system is hierarchically cascade-connected to the computer 1 as shown in FIG. 12, the address spaces required for the boards installed into the computer 1 or the expanding housing system are automatically allocated without being overlapped.

Here, at the step S41 of the steps S41 to S56, the size of the address space occupied by the expanding system A (or B) is set to 32 MB. In this case, the access is carried out from the computer 1 to the expanded housing system A (or B) using the second segment which is allocated to the slots 100 to 120 at the step S22 (FIG. 10).

Further, at the step S42, the setting (temporary setting) of the entry (third entry) of the mapping table 50 and the entry of the mapping table 310 for managing the third segment of the I/O address space are carried out so that 48th segment (third segment) from the top segment in the I/O address space is allocated to the expanding housing system A (or B).

Still further, at a step S44, the setting (temporary setting) of, for example, 16th entry from the top of a mapping table having the same configuration as the mapping table 50 or 310 in the expanding housing system A (or B) is carried out using the second segment of the mapping table 50 through the adapter board 3, the cable 420 and the expanded housing 4 by the computer 1.

Using the third segment, the 16-th entry is read out from the head of the mapping table of the expanding housing system A (or B), thereby carrying out the access to the expanded board (the ID-ROM designed on the expanded board in the same configuration as the ID-ROM 220) installed into the expanding housing system A (or B). Subsequently, the size of the address space to be occupied by the expanded board is read out from the ID-ROM, and the setting of the mapping table of the expanding housing system A (or B) is carried out on the basis of the size of the address space.

Through the processing of the flowchart as shown in FIGS. 8, 10 and 11, if the following case is satisfied:

the adapter board 3 is installed into the slot 100 of the computer 1, the expanded board 2 of address space 4 MB is installed into the slot 110 of the computer 1, the expanded board 2a of address space 8 MB is installed into the slot 120 of the computer 1, the expanded board 2b of address space 8 MB is installed into the sub slot 360 of the expanding housing 4 connected through the cable 420 to the adapter board 3, the adopter board 3a is installed into the sub slot 370 of the expanding housing 4, the adapter board 3b is installed into the sub slot 380 of the expanding housing 4, the expanded board 2c of address space 4 MB is installed into the sub sub slot 360a of the expanding housing 4a connected to the adapter 3a through the cable 420a, the expanded board 2d of address space 8 MB is installed into the sub sub slot 370a of the expanding housing 4a, the expanded board 2e of address space 2 MB is installed into the sub sub slot 380a of the expanding housing 4a, an expanded board 2f of address space 4 MB is installed into the sub sub slot 360b of the expanding housing 4b connected to the adapter board 3b through the cable 420b, an expanded board 2g of address space 4 MB is installed into the sub sub slot 370b of the expanding housing 4b, and an expanded board 2h of address space 4 MB is installed into the sub sub slot 380b of the expanding housing 4b, the address spaces are allocated as follows.

That is, the board installed into the slot 100 is identified as the adapter board 3 (at the step S4), and the sub slot processing (at the step S5) is carried out. Through the sub slot processing, the address spaces of the expanded board 2b and the adapter board 3a or 3b (the expanding housing system A or B) installed into the expanding housing 4 are arranged in small-to-large size order and so that the addresses thereof are aligned. In this case, the adapter board is installed into the expanding housing 4, and thus the sub sub slot processing (step S27) is first carried out.

Through the sub sub slot processing, the address spaces occupied by the expanded boards 2c, 2d and 2e installed into the expanding housing 4a are arranged in small-to-large size order and so that the addresses thereof are aligned with one another (steps S48 to S56). The arrangement result is as follows:

| address space of adapter board 3a | 1 MB |
|---|---|
| unused area | 1 MB |
| address space of expanded board 2e | 2 MB |
| address space of expanded board 2c | 4 MB |
| address space of expanded board 2d | 8 MB |

The address space occupied by the expanding housing system A is equal to 16 (=1+1+2+4+8) MB.

Further, through the sub sub slot processing, the address spaces occupied by the expanded boards 2f, 2g and 2h installed into the expanding housing 4b are arranged in small-to-large size order and so that the addresses thereof are aligned with one another. The arrangement result is as follows:

| address space of adapter board 3b | 1 MB |
|---|---|
| unused area | 3 MB |
| address space of expanded board 2f | 4 MB |
| address space of expanded board 2g | 4 MB |
| address space of expanded board 2h | 4 MB |

The address space occupied by the expanding housing system B is equal to 16 (=1+3+4+4+4) MB.

Through the sub slot processing, the address spaces occupied by the expanded board 2b and the adapter board 3a or 3b (expanding housing system A or B) are arranged in small-to-large size order and so that the addresses are aligned with one another (steps S30 to 38). The arrangement result is as follows:

| address space of adapter board 3 | 1 MB |
|---|---|
| unused area | 7 MB |
| address space of expanded board 2b | 8 MB |
| address space of expanding housing system A | 16 MB |
| (address space of adapter board 3a | 1 MB |
| unused area | 1 MB |
| address space of expanded board 2e | 2 MB |
| address space of expanded board 2c | 4 MB |
| address space of expanded board 2d | 8 MB) |
| address space of expanding housing system B | 16 MB |
| (address space of adapter board 3b | 1 MB |
| unused area | 3 MB |
| address space of expanded board 2f | 4 MB |
| address space of expanded board 2g | 4 MB |
| address space of expanded board 2h | 4 MB) |

The address space occupied by the expanding housing 4 (expanding housing system) is equal to 48 (=1+7+8+16+16) MB.

Further, the address spaces of the expanding housing 4 (expanded housing system) and the expanded boards 2, 2a are arranged in large-to-small size order and so that the addresses thereof are aligned with one another (steps S8 to S14), and finally the address spaces are allocated as follows.

| address space of expanding housing 4 | 48 MB |
|---|---|
| (address space of adapter board 3 | 1 MB |
| unused area | 7 MB |
| address space of expanded board 2b | 8 MB |
| address space of expanding housing system A | 16 MB |
| (address space of adapter board 3a | 1 MB |
| unused area | 1 MB |
| address space of expanded board 2e | 2 MB |
| address space of expanded board 2c | 4 MB |
| address space of expanded board 2d | 8 MB) |
| address space of expanding housing system B | 16 MB |
| (address space of adapter board 3b | 1 MB |
| unused area | 3 MB |
| address space of expanded board 2f | 4 MB |
| address space of expanded board 2g | 4 MB |
| address space of expanded board 2h | 4 MB)) |
| address space of expanded board 2a | 8 MB |
| address space of expanded board 2 | 4 MB |
| unused area | 4 MB |

The expanding housing 4a or 4b as shown in FIG. 12 may be further cascade-connected to an expanding housing system. In this case, the sub slot processing from the step S21 to the step S38 as shown in FIG. 10 may be recursively accessed as the sub sub slot processing at the step S27 as shown in FIG. 10 at times whose number is equal to the hierarchical number of the further cascade-connected expanding housing system.

As described above, according to the expanded board of this invention, the size of the address space to be occupied by the expanded board is beforehand stored in the storage means, and the address space having the size is adaptably allocated on the address space of the information processing device. Accordingly, no operation of setting the address to be allocated to the expanded board is required, and thus the user is released from feeling troublesome.

According to the information processing device of this invention, the sizes of the address spaces to be occupied by plural boards installed into plural slots are identified, and on the basis of the identification result, the corresponding relationship between the address of the information processing device and the slot selection signal for selecting any one of the plural slots is set by the slot corresponding relationship setting means. Accordingly, the address spaces of the expanded boards, etc. installed into the plural slots are adaptably allocated on the address space of the information processing device without being overlapped. Therefore, no operation of setting the address to be allocated to the expanded board or the like is required, and thus the user is released from feeling troublesome.

According to the expanding housing system of this invention, the corresponding relationship between the address supplied from the information processing device and the sub slot selection signal for selecting any one of plural sub slots of an expanded housing into which expanded boards are installed is set on the basis of the sizes of the address spaces to be occupied by the expanded boards into the plural sub slots. Accordingly, the address spaces of the expanded boards installed into the plural sub slots are allocated by desired amount of the address space of the information processing device without being overlapped, and thus the expanded boards can be prevented from malfunctioning because an address space to be allocated is insufficient.

Further, according to the expanding housing system, the hierarchical cascade-connection can be performed. Therefore, a large number of expanded boards can be used.

The invention may be embodied in other specific forms without departing from the spirit of essential characteristics thereof. The present embodiment is therefore to be considered in all respects as illustrative and not restrictive, the scope of the invention being indicated by the appended claims rather than by the foregoing description and all charges which come within the meaning and range of equivalency of the claims are therefore intended to be embraced therein.

What is claimed is:

1. An information processing device having plural slots into which boards may be detachably installed and an I/O memory space dedicated to said slots said boards comprising an address space including a first ID memory, which includes a read only memory (ROM), in which has been stored prior to installation in said information processing device size information disclosing the size of an address space occupied by said board said device comprising;

a first mapping table, including a random access memory, for storing the size information of any such boards installed in said slots;

means for reading said size information from said first ID memory of any such boards installed in said slots;

means for storing said size information in said first mapping table;

means for sorting said boards by memory size from largest to smallest prior to storing said size information in said mapping table; and means for selectively assigning a portion of the I/O memory space to said boards in order from largest to smallest prior to storing said size information in said first mapping table.

2. An information processing device as set forth in claim 1 wherein said I/O memory space is partitioned into numerically arranged segments of equal size and wherein said means for selectively assigning comprises, means for determining if each of said boards has a memory size larger than said segment size, means for determining, when a board has a memory size larger than said segment size, if an address space to be allocated to said board is aligned with an address boundary which is a power of two, means for aligning an address space allocated to a board with an address boundary which is a power of two, when said board has a memory size larger than said segment size and said board is not aligned with an address boundary which is a power of two, means for allocating plural segments in said numerical order to a board, if said board has a memory size larger than said segment size, and means for allocating one segment in said numerical order to a board, if said board has a memory size less than or equal to said segment size, wherein said means for storing stores information in said first mapping table disclosing said segment allocations.

3. An information processing device having plural slots into which boards may be detachably installed and an I/O memory space dedicated to said slots, said boards comprising an address space including a first ID memory in which has been stored prior to installation in said information processing device, size information disclosing the size of an address space occupied by said board, said device comprising;

a first mapping table for storing the size information of any such boards installed in said slots;

means for reading said size information from said first ID memory of any such boards installed in said slots;

means for storing said size information in said first mapping table;

plural sub-slots into which additional boards may be detachably installed;

a second mapping table for storing size information for any such boards installed in said sub-slots;

a second ID memory in which is stored information identifying the adapter board as an adapter board; and an occupation size register for storing an occupational size of an address space occupied by said expanding housing.

4. An information processing device as set forth in claim 3;

wherein said means for reading said size information from said first ID memory further includes means for determining if a board installed in any of said slots is an adapter board, and said device further includes means for sub-slot processing for each adapter board, said means for sub-slot processing including;

means for temporarily storing in said occupation size register a predetermined maximum size value, means for reading said size information from said second ID memory of said adapter board, means for storing said size information in said second mapping table.

5. An information processing device as set forth in claim 4 wherein said means for sub-slot processing further comprises;

means for sorting said boards in said sub-slots by memory size from smallest to largest prior to storing said size information in said second mapping table, and second means for selectively assigning a portion of the I/O memory space to each of said boards in said sub-slots in order from smallest to largest prior to storing said size information in said second mapping table.

6. An information processing device as set forth in claim 5 wherein said I/O memory space is partitioned into numerically arranged segments of equal size, wherein said second means for selectively assigning comprises, means for determining if each of said boards in said sub-slots has a memory size larger than said segment size, if a board in a sub-slot has a memory size larger than said segment size, determining if an address space to be allocated to said board is aligned with an address boundary which is a power of two, if a board in a sub-slot has a memory size larger than said segment size and said board is not aligned with an address boundary which is a power of two, aligning said address space allocated to said board with an address boundary which is a power of two, if a board in a sub-slot has a memory size larger than said segment size, allocating plural segments in said numerical order to said board, and if a board in a sub-slot has a memory size less than or equal to said segment size, allocating one segment in said numerical order to said board.

7. In an information processing device having plural slots into which boards may be detachably installed and an I/O memory space dedicated to said slots, said boards comprising an address space including a first ID memory in which has been stored prior to installation in said information processing device, size information disclosing the size of an address space occupied by said board, a method of allocating I/O memory space dedicated to said slots amongst said boards, comprising the steps of:

(1) reading said size information from said first ID memory of any such boards installed in said slots;

(1.8) sorting said boards by memory size from largest to smallest;

(1.9) selectively assigning a portion of the I/O memory space to said boards in order from largest to smallest; and (2) storing said size information in a first mapping table.

8. A method as set forth in claim 7 wherein said I/O memory space is partitioned into numerically arranged segments of equal size and wherein step (1.9) further comprises the steps of, (1.9.1) determining if each of said boards has a memory size larger than said segment size, (1.9.2) if a board has a memory size larger than said segment size, determining if an address space to be allocated to said board is aligned with an address boundary which is a power of two, (1.9.3) if a board has a memory size larger than said segment size and said board is not aligned with an address boundary which is a power of two, aligning said address space allocated to said board with an address boundary which is a power of two, (1.9.4) if a board has a memory size larger than said segment size, allocating plural segments in said numerical order to said board, and (1.9.5) if a board has a memory size less than or equal to said segment size, allocating one segment in said numerical order to said board, and wherein step (2) comprises storing information disclosing said segment allocations.

9. In an information processing device having plural slots into which boards may be detachably installed and an I/O memory space dedicated to said slots said boards comprising an address space including a first ID memory in which has been stored prior to installation in said information processing device, size information disclosing the size of an address space occupied by said board, a method of allocating I/O memory space dedicated to said slots amongst said boards, comprising the steps of:

(1) reading said size information from said first ID memory of any such boards installed in said slots:

(2) storing said size information in a first mapping table;

wherein at least one of said boards is an adapter board of an expanding housing, said expanding housing further comprising plural sub-slots into which additional boards may be detachably installed, a second mapping table for storing size information for any such boards installed in said sub-slots, a second ID memory in which is stored information identifying the adapter board as an adapter board, and an occupation size register for storing an occupational size of an address space occupied by said expanding housing, and wherein step (1) further comprises the step of;

(1.1) determining if a board installed in any of said slots is an adapter board.

10. A method as set forth in claim 9 further comprising the steps for each adapter board of;

(1.2) temporarily storing in said occupation size register a predetermined maximum size value, (1.3) reading said size information from said second ID memory of said adapter board, (1.7) storing said size information in said second mapping table.

11. A method as set forth in claim 10 further comprising the steps of;

(1.4) sorting said boards in said sub-slots by memory size from smallest to largest, and (1.5) selectively assigning a portion of the I/O memory space to each of said boards in said sub-slots in order from smallest to largest.

12. A method as set forth in claim 11 wherein step (1.5) comprises the steps of;

(1.5.1) determining if each of said boards in said sub-slots has a memory size larger than said segment size, (1.5.2) if a board in a sub-slot has a memory size larger than said segment size, determining if an address space to be allocated to said board is aligned with an address boundary which is a power of two, (1.5.3) if a board in a sub-slot has a memory size larger than said segment size and said board is not aligned with an address boundary which is a power of two, aligning said address space allocated to said board with an address boundary which is a power of two, (1.5.4) if a board in a sub-slot has a memory size larger than said segment size, allocating plural segments in said numerical order to said board, and (1.5.5) if said board has a memory size less than or equal to said segment size, allocating one segment in said numerical order to said board.

* * * * *